US008775065B2

(12) United States Patent
Gupta et al.

(10) Patent No.: US 8,775,065 B2
(45) Date of Patent: *Jul. 8, 2014

(54) RADIO MODEL UPDATING

(75) Inventors: Rajarshi Gupta, Sunnyvale, CA (US); Ayman Fawzy Naguib, Cupertino, CA (US); Alok Aggarwal, Foster City, CA (US); Saumitra Mohan Das, San Jose, CA (US); Vinay Sridhara, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

This patent is subject to a terminal disclaimer.

(21) Appl. No.: 13/078,644

(22) Filed: Apr. 1, 2011

(65) Prior Publication Data

US 2011/0246148 A1    Oct. 6, 2011

Related U.S. Application Data

(60) Provisional application No. 61/320,966, filed on Apr. 5, 2010.

(51) Int. Cl.
*G01C 21/00* (2006.01)

(52) U.S. Cl.
USPC ........... 701/408; 701/431; 701/454; 701/469; 701/541; 342/452; 342/451; 342/464; 342/463; 342/387; 455/456.1; 455/67.11; 455/456.5; 455/517; 455/456.2

(58) Field of Classification Search
CPC ... H04W 64/00; H04W 68/025; H04W 68/02; G01C 21/206
USPC .............. 701/25, 50, 301, 408, 431; 342/452, 342/451, 464, 463, 387; 455/456.1, 67.11, 455/456.5, 517, 456.2
See application file for complete search history.

(56) References Cited

U.S. PATENT DOCUMENTS 6,240,360 B1 * 5/2001 Phelan ......................... 701/438
6,259,405 B1 * 7/2001 Stewart et al. ................ 342/457

(Continued)

FOREIGN PATENT DOCUMENTS

EP        1689126 A1      8/2006
JP    H07328968 A     12/1995

(Continued)

OTHER PUBLICATIONS

International Preliminary Report on Patentability—PCT/US2011/031162, The International Bureau of WIPO—Geneva, Switzerland, Jul. 30, 2012.

(Continued)

*Primary Examiner* — Redhwan k Mawari
(74) *Attorney, Agent, or Firm* — Arnold J. Gum

(57) ABSTRACT

The subject matter disclosed herein relates to systems, methods, apparatuses, devices, articles, and means for updating radio models. For certain example implementations, a method for one or more server devices may comprise receiving at one or more communication interfaces at least one measurement that corresponds to a position of a first mobile device within an indoor environment. At least one radio model that is stored in one or more memories may be updated based, at least in part, on the at least one measurement to produce at least one updated radio model. The at least one radio model and the at least one updated radio model may correspond to the indoor environment. The at least one updated radio model may be transmitted to enable a second mobile device to use the at least one updated radio model for positioning within the indoor environment. Other example implementations are described herein.

50 Claims, 12 Drawing Sheets

(56) References Cited

U.S. PATENT DOCUMENTS

| | | | |
|---|---|---|---|
| 6,486,831 B1* | 11/2002 | Martorana et al. | 342/458 |
| 7,035,650 B1* | 4/2006 | Moskowitz et al. | 455/456.5 |
| 7,474,897 B2* | 1/2009 | Morgan et al. | 455/456.5 |
| 7,493,127 B2* | 2/2009 | Morgan et al. | 455/456.5 |
| 7,647,055 B2* | 1/2010 | Gum et al. | 455/456.1 |
| 8,200,244 B2* | 6/2012 | Levin et al. | 455/456.2 |
| 8,350,758 B1* | 1/2013 | Parvizi et al. | 342/452 |
| 2003/0008661 A1* | 1/2003 | Joyce et al. | 455/456 |
| 2004/0015325 A1* | 1/2004 | Hirano et al. | 702/152 |
| 2004/0061646 A1* | 4/2004 | Andrews et al. | 342/463 |
| 2005/0124354 A1* | 6/2005 | Durgin | 455/456.1 |
| 2005/0143909 A1* | 6/2005 | Orwant | 701/207 |
| 2006/0128370 A1* | 6/2006 | Tahara | 455/420 |
| 2007/0042716 A1* | 2/2007 | Goodall et al. | 455/67.11 |
| 2007/0143016 A1* | 6/2007 | Kung et al. | 701/213 |
| 2007/0150186 A1* | 6/2007 | Ingulsrud | 701/211 |
| 2007/0184845 A1* | 8/2007 | Troncoso | 455/456.1 |
| 2007/0184850 A1* | 8/2007 | Hupp et al. | 455/456.1 |
| 2008/0154720 A1* | 6/2008 | Gounares et al. | 705/14 |
| 2008/0280624 A1* | 11/2008 | Wrappe | 455/456.1 |
| 2009/0019095 A1* | 1/2009 | Asahara et al. | 707/203 |
| 2009/0043462 A1* | 2/2009 | Stratton et al. | 701/50 |
| 2009/0149990 A1* | 6/2009 | Myeong et al. | 700/245 |
| 2009/0280835 A1* | 11/2009 | Males et al. | 455/456.5 |
| 2010/0008337 A1* | 1/2010 | Bajko | 370/338 |
| 2010/0057336 A1 | 3/2010 | Levine et al. | |
| 2010/0090901 A1* | 4/2010 | Smith et al. | 342/451 |
| 2010/0125409 A1* | 5/2010 | Prehofer | 701/207 |
| 2010/0317379 A1* | 12/2010 | Gupta | 455/466 |
| 2011/0090123 A1* | 4/2011 | Sridhara et al. | 342/450 |
| 2011/0137855 A1* | 6/2011 | Shustef | 707/609 |
| 2011/0163914 A1* | 7/2011 | Seymour | 342/357.42 |
| 2011/0165892 A1* | 7/2011 | Ristich et al. | 455/456.2 |
| 2013/0017842 A1 | 1/2013 | Gupta et al. | |
| 2013/0184012 A1* | 7/2013 | Gupta et al. | 455/456.6 |

FOREIGN PATENT DOCUMENTS

| | | |
|---|---|---|
| JP | H1094040 A | 4/1998 |
| JP | 2005532560 A | 10/2005 |
| JP | 2005532754 A | 10/2005 |
| JP | 2006308361 A | 11/2006 |
| JP | 2007187652 A | 7/2007 |
| JP | 4365104 B2 | 11/2009 |
| WO | WO-2004008795 A1 | 1/2004 |

OTHER PUBLICATIONS

International Search Report and Written Opinion—PCT/US2011/031162, International Search Authority—European Patent Office—Aug. 22, 2011.
Minkyu Lee et al: "Crowdsourced radiomap for room-level place recognition in urban environment", Pervasive Computing and Communications Workshops (Percom Workshops), 2010 8th IEEE International Conference on, IEEE, Piscataway, NJ, USA, Mar. 29, 2010, pp. 648-653, XP031679892, ISBN: 978-1-4244-6605-.
Teller Batta, Charrow et a l : "Organic Indoor Location Discovery", Jun. 22, 2008, pp. 1-14, XP002648821, Krakow Poland Retrieved from the Internet: URL:http://dspace.mit.edu/bi tstream/handle/1721.1/43951/MIT-CSAIL-TR-2008-075.pdf"sequence=1 [retrieved on Jul. 8, 2011].
Candy, "A Mobile Indoor Location-Based GIS Application," International Symposium on Mobile Mapping Technology [Online], 2007, 6 pages.
Miu, "Design and Implementation of a Indoor Mobile Navigation System," Massachusetts Institute of Technology, 2002, 60 pages.
Schonfeld, "Location-Tracking Startup Sense Networks Emerges from Stealth to Answer the Question: Where is Everybody?" http://techcrunch.com/2008/06/09/location-tracking-startup-sense-networks-emerges-from-stealth-to-answer-the-question-where-is-everybody/, Jun. 9, 2008, 1 page.
Min, et al, "The Mobile Spatial DBMS for the Partial Map Air Update in the Navigation," Proceedings fo the 11th International IEEE Conference on Intelligent Transportation Systems, Beijing, China, Oct. 12-15, 2008, pp. 476-481.
Beal Jr., et al, "Contextual Geolocation: A Specialized Application for Improving Indoor Location Awareness in Wireless Local Area Networks," College of Graduate Studies and Research, Minnesota State University, Mankato, MN, 2003, 17 pages.
Meneses, et al, "Enhancing the Location-Context Through Inference Over Positioning Data," College of Graduate Studies and Research, Minnesota State University, Mankato, MN, 2003, pp. 40-49.
Website Skyhook, "How it Works—Overview," http://www.skyhookwireless.com/howitworks/, Mar. 19, 2011, 1 page.
Website Skyhook, "How it Works—Architecture," http://www.skyhookwireless.com/howitworks/architecture.php, Mar. 19, 2011, 1 page.
Non-Provisional U.S. Appl. No. 12/895,583, filed Sep. 30, 2010, 85 pages.
Non-Provisional U.S. Appl. No. 13/010,577, filed Jan. 19, 2011, 98 pages.

* cited by examiner

RADIO MODEL UPDATING

CLAIM OF PRIORITY UNDER 35 U.S.C. §119

This application claims priority under 35 USC 119 to U.S. Provisional Application Ser. No. 61/320,966, filed 5 Apr. 2010, and entitled "Indoor Navigation with Server Interactions," which is assigned to the assignee hereof and which is incorporated herein by reference.

BACKGROUND

1. Field

The subject matter disclosed herein relates to radio model updating.

2. Information

Humanity has continually struggled to journey from one point to another. In ancient times, individuals in unfamiliar territory wandered around without guidance, or perhaps they risked asking local inhabitants for directions. People eventually developed maps to provide written guidance for reaching a desired destination. As literacy and the availability of paper became more common, more people gained the ability to use maps during their travels.

Maps began to be available in electronic form during the twentieth century. With the advent of the Internet, people could electronically access maps of many places from all over the globe. Web mapping services could also provide directions from point "A" to point "B". These directions from web-based mapping services were relatively static. With the invention of satellite-positioning system (SPS) technology and ever-smaller electronic devices, however, so-called turn-by-turn directions could be provided dynamically as travelers journeyed toward their destination.

These electronic maps and web-based mapping services focus on providing directions in particular environments and certain situations. Unfortunately, there are other environments and situations for which they have not been designed. Consequently, there remain a number of areas in which navigational or other location-based services may be improved.

BRIEF DESCRIPTION OF THE FIGURES

Non-limiting and non-exhaustive aspects, features, etc. will be described with reference to the following figures, wherein like reference numerals may refer to like parts throughout the various figures.

SUMMARY

Figure 1:
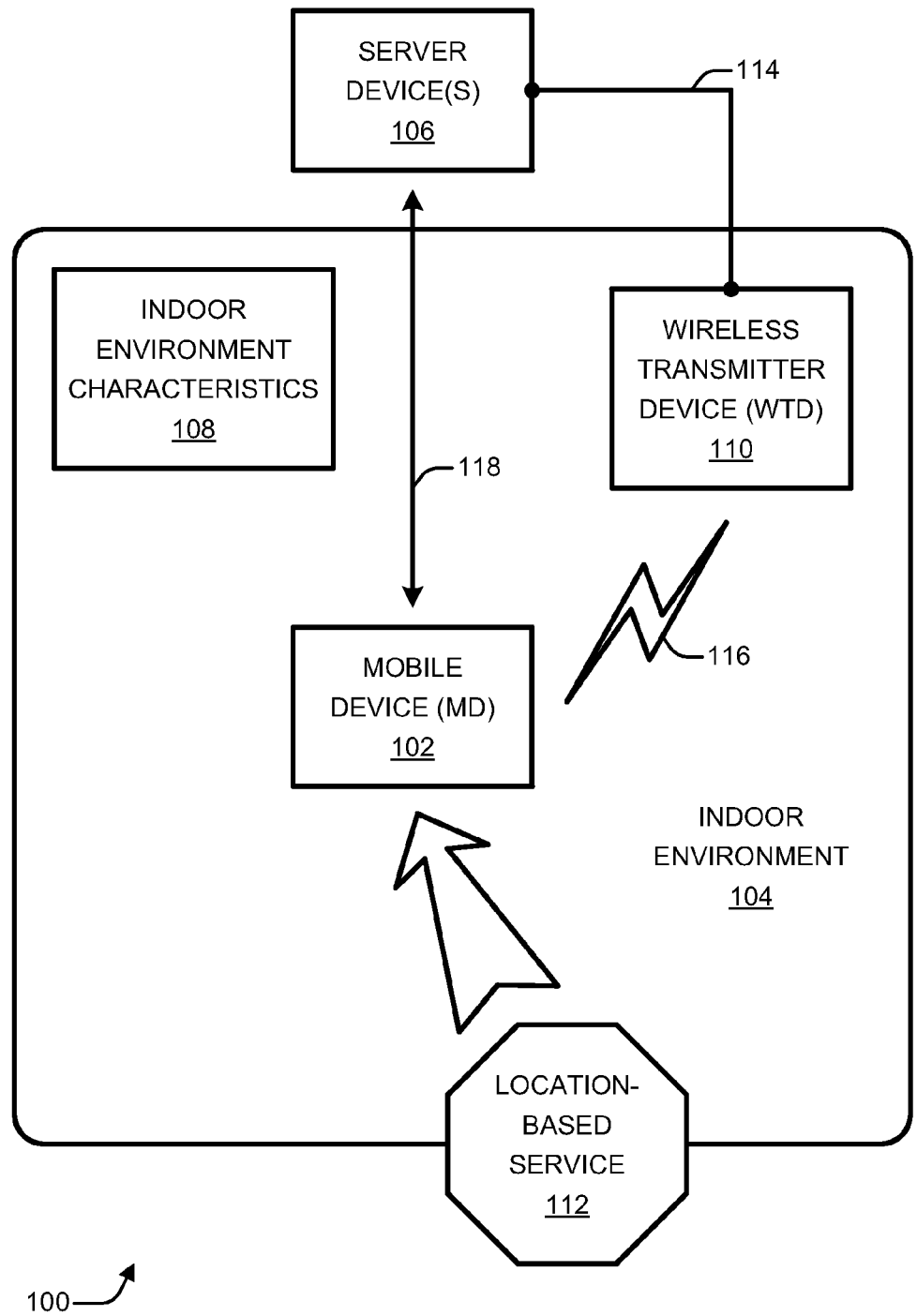
FIG. 1 is a schematic block diagram illustrating a mobile device within an example indoor environment in which the mobile device may be provided access to indoor environment characteristics via one or more server devices such that a location-based service may be provided according to an implementation.

For certain example implementations, a method for one or more server devices may comprise: receiving at one or more communication interfaces at least one measurement that corresponds to a position of a first mobile device within an indoor environment; updating at least one radio model that is stored in one or more memories based, at least in part, on the at least one measurement to produce at least one updated radio model, the at least one radio model and the at least one updated radio model corresponding to the indoor environment; and transmitting the at least one updated radio model to enable a second mobile device to use the at least one updated radio model for positioning within the indoor environment. For certain example implementations, a special purpose computing apparatus for updating a radio model may comprise: at least one memory to store instructions; and one or more processors to execute said instructions to: receive at least one measurement that corresponds to a position of a first mobile device within an indoor environment; update at least one radio model based, at least in part, on the at least one measurement to produce at least one updated radio model, the at least one radio model and the at least one updated radio model corresponding to the indoor environment; and transmit the at least one updated radio model to enable a second mobile device to use the at least one updated radio model for positioning within the indoor environment. For certain example implementations, a special purpose computing apparatus for updating a radio model may comprise: means for receiving at least one measurement that corresponds to a position of a first mobile device within an indoor environment; means for updating at least one radio model based, at least in part, on the at least one measurement to produce at least one updated radio model, the at least one radio model and the at least one updated radio model corresponding to the indoor environment; and means for transmitting the at least one updated radio model to enable a second mobile device to use the at least one updated radio model for positioning within the indoor environment. For certain example implementations, an article may comprise: at least one storage medium having stored thereon instructions executable by one or more processors to: receive via one or more communication interfaces at least one measurement that corresponds to a position of a first mobile device within an indoor environment; update at least one radio model based, at least in part, on the at least one measurement to produce at least one updated radio model, the at least one radio model and the at least one updated radio model corresponding to the indoor environment; and transmit the at least one updated radio model to enable a second mobile device to use the at least one updated radio model for positioning within the indoor environment. It should be appreciated, however, that these are merely example implementations and that other implementations are described herein and may be implemented without departing from claimed subject matter.

For certain example implementations, a method for a mobile device may comprise: wirelessly receiving from one or more server devices at least one updated radio model, wherein the at least one updated radio model is updated based, at least in part, on at least one measurement that corresponds to at least one position of one or more other mobile devices within an indoor environment; and performing a positioning operation for the mobile device within the indoor environment using the at least one updated radio model, wherein the at least one updated radio model corresponds to the indoor environment, and the at least one measurement is wirelessly received by the one or more server devices from the one or more other mobile devices. For certain example implementations, a mobile device for using an updated radio model may comprise: at least one memory to store instructions; and one or more processors to execute said instructions to: wirelessly receive from one or more server devices at least one updated radio model, wherein the at least one updated radio model is updated based, at least in part, on at least one measurement that corresponds to at least one position of one or more other mobile devices within an indoor environment; and perform a positioning operation for the mobile device within the indoor environment using the at least one updated radio model, wherein the at least one updated radio model corresponds to the indoor environment, and the at least one measurement is wirelessly received by the one or more server devices from the one or more other mobile devices. For certain example implementations, a mobile device for using an updated radio model may comprise: means for wirelessly receiving from one or more servers at least one updated radio model, wherein the at least one updated radio model is updated based, at least in part, on at least one measurement that corresponds to at least one position of one or more mobile devices within an indoor environment; and means for performing a positioning operation within the indoor environment using the at least one updated radio model, wherein the at least one updated radio model corresponds to the indoor environment, and the at least one measurement is wirelessly received by the one or more servers from the one or more mobile devices. For certain example implementations, an article may comprise: at least one storage medium having stored thereon instructions executable by one or more processors to: wirelessly receive from one or more server devices at least one updated radio model, wherein the at least one updated radio model is updated based, at least in part, on at least one measurement that corresponds to at least one position of one or more other mobile devices within an indoor environment; and perform a positioning operation for a particular mobile device within the indoor environment using the at least one updated radio model, wherein the at least one updated radio model corresponds to the indoor environment, and the at least one measurement is wirelessly received by the one or more server devices from the one or more other mobile devices. It should be appreciated, however, that these are merely example implementations and that other implementations are described herein and may be implemented without departing from claimed subject matter.

DETAILED DESCRIPTION

Reference throughout this Specification to "a feature," "one feature," "an example," "one example," and so forth means that a particular feature, structure, characteristic, or aspect, etc. that is described in connection with a feature or example may be relevant to at least one feature or example of claimed subject matter. Thus, appearances of a phrase such as "in one example," "for example," "in one feature," "a feature," "a particular feature," "in an example implementation," or "for certain example implementations," etc. in various places throughout this Specification are not necessarily all referring to the same feature, example, or example implementation. Furthermore, particular features, examples, structures, characteristics, or aspects, etc. may be combined in one or more example devices, example methods, example systems, or other example implementations.

Many indoor environments are sufficiently large, complex, or otherwise difficult to navigate so that navigational services may be beneficial, e.g., to a user of a mobile device. Hence, a user may want a navigational service, which may involve maps or directions, etc., or another location-based service (LBS) to be provided via a mobile device in an indoor area. Unfortunately, in contrast with large-scale, outdoor areas in which maps or mobile device locations may be made available via e.g. satellite imagery or satellite positioning system (SPS) technologies, indoor maps or mobile device locations are often not as readily available. Satellites cannot merely take a picture of interior features of a structure, and SPS signals may be too attenuated for use within a structure.

Location-based services may include positioning, personal vehicle/pedestrian navigation, real-time turn-by-turn directions, or location-based searching (e.g., searching of local points of interest), just to name a few examples. To provide location-based services indoors, one or more local coordinate systems may be established for particular indoor environments. An indoor environment may be referred to as a "location context." A server device may store and associate identifiers, such as location context identifiers (LCIs), with specific "location contexts." A location context may include locally-defined areas or other environments such as, for example, particular floors of buildings or other indoor areas that may not be mapped according to a global coordinate system. Location context identifiers may be used as handles for requesting additional information associated with a location context (e.g., for requesting additional information that is laid over or linked to a schematic map of an indoor environment). Such additional information may include, by way of example but not limitation, routes or paths over an indoor map, points of interest that are local or unique to certain location contexts, etc., just to name a couple of examples. However, claimed subject matter is not limited to any particular coordinate system or systems or to any particular location context or identifier thereof. Moreover, a given indoor environment or local context may be associated with at least a portion of at least one local coordinate system, at least a portion of at least one global coordinate system, at least a portion of at least one local coordinate system that may be translated into one or more other local coordinate systems or global coordinate systems, or any combination thereof, etc., just to name a few examples.

A mobile device may use an identifier, such as a location context identifier, to obtain a schematic map of an indoor environment. Location-based data may be overlaid on a schematic map of an indoor environment. Additionally or alternatively, a mobile device may use an identifier to obtain information to be used in a particular application connected to a particular corresponding location context. For example, a mobile device may obtain information descriptive of a particular location context for use in an indoor pedestrian navigation application. Such information may include a schematic map that provides or enables a display of, for example, corridors, rooms, hallways, doors, entry ways, restrooms, or other points of interest of an indoor environment. For an example navigational application, such information may define a routing topology set out in a coordinate system that is local to a particular location context, as distinguishable from a global coordinate system. A mobile device may also use one or more identifiers to obtain point of interest (POI) information. POI information may include, by way of example only, information that describes or identifies particular locations or potential destinations of an indoor environment. Examples of POI information may include, but are not limited to, names of stores, locations of restrooms, names of office inhabitants, purposes of rooms, identifications of stairs or elevators, identifications of points of egress or ingress, or any combination thereof, etc. Use of information that is obtained in response to a request that specifies an identifier, such as a location context identifier, may depend, at least partially, on a position of a mobile device. Unfortunately for users located within indoor environments, as explained further below, performing a positioning operation to estimate a position of a mobile device may be more difficult indoors as compared to outdoors.

As indicated above, electronic mapping or other navigational services in outdoor environments may be effectuated using SPS data or using positioning data acquired via trilateration with multiple cellular base stations or similar fixed transmitting stations. With indoor environments, on the other hand, SPS signals may often be too weak or undetectable. Likewise, there may be too few received signals or an insufficient strength of signals received at an indoor location with regard to signals that are transmitted from terrestrial cellular base stations. Consequently, positioning strategies that are effective in outdoor environments may be inadequate for indoor environments. To combat these problems, indoor positioning for mobile devices may be effectuated at least partly by processing signals transmitted from wireless transmitter devices that are located within an indoor environment. Wireless transmitter devices may include, but are not limited to, wireless transmitters that comport with a Wi-Fi access point (AP) protocol, a Bluetooth protocol, a femtocell protocol, or any combination thereof, etc.

Unfortunately, there are other difficulties with indoor environments. For example, many indoor environments may include walls or other obstacles. Interior obstacles may introduce at least two different difficulties. First, obstacles can block, reflect, attenuate, or otherwise affect wireless transmissions within an indoor environment. Second, obstacles can limit where it is feasible for a mobile device to be located within an indoor environment or how a mobile device may move within an indoor environment. A schematic map may show, by way of example only, locations of obstacles and feasible positions for mobile devices or users of mobile devices within an indoor environment. A schematic map for an indoor environment may therefore be used to facilitate navigation within the indoor environment.

A radio model may additionally facilitate navigation by aiding, for example, a positioning operation of a mobile device within an indoor environment. A positioning operation for a mobile device may, for example, determine at least an estimated position of the mobile device, including, but by way of example only, with respect to a schematic map. By way of example but not limitation, a radio model may link stored patterns of values to positions within an indoor environment or to distances to a wireless transmitter device of an indoor environment. Stored value patterns may comprise or be derived from, by way of example but not limitation, at least one propagation parameter, at least one received signal strength indication/indicator (RSSI), at least one round trip time (RTT), at least one round trip delay (RTD), or any combination thereof, etc. For example, a radio model may include an RSSI value that corresponds to a particular position on a schematic map of an indoor environment. Or a radio model may include an RTT value that corresponds to a particular position on a schematic map of an indoor environment. Alternatively, a radio model may include a propagation parameter value that corresponds to a particular position on a schematic map or to a range to at least one wireless transmitter device of an indoor environment. A radio model may include values derived from any one or more of these example measurements or from other values, which may be predicted or modeled, for each of multiple positions of a schematic map of an indoor environment. Radio models may also be realized in alternative implementations without departing from claimed subject matter.

As noted above, indoor environments may have multiple obstacles that interfere with wireless transmissions or impede mobility. As a result, measurable values for a radio model may be difficult to ascertain, may fluctuate over relatively shorter time frames, may change gradually over relatively longer time frames, and so forth. Similarly, predicted values for a radio model may be difficult to model. Locations of interior obstacles or locations of wireless transmitter devices may also change from time to time. Consequently, radio models for indoor environments may be initially inaccurate or may become stale. Accurate or current radio models, on the other hand, may be used to improve positioning estimates for mobile devices within indoor environments.

Certain example implementations as described herein may relate generally to radio model updating, and more specifically, but by way of example but not limitation, to a radio model that is updated for one mobile device based, at least partly, on at least one measurement ascertained by another mobile device.

Accordingly, for certain example implementations, one or more server devices may receive at least one measurement that corresponds to a position of a first mobile device within an indoor environment. At least one radio model may be updated based, at least in part, on the at least one measurement to produce at least one updated radio model. The at least one radio model and the at least one updated radio model may correspond to the indoor environment. The at least one updated radio model may be transmitted to enable a second mobile device to use the at least one updated radio model for positioning within the indoor environment.

Also or alternatively, for certain example implementations, a mobile device may wirelessly receive from one or more server devices at least one updated radio model. The at least one updated radio model may be updated based, at least in part, on at least one measurement that corresponds to at least one position of one or more other mobile devices within an indoor environment. The at least one measurement may have been wirelessly received by the one or more server devices from the one or more other mobile devices. The mobile device may perform a positioning operation within the indoor environment using the at least one updated radio model, which may correspond to the indoor environment.

Alternatively or additionally to using an updated radio model, a mobile device may participate in updating a radio model. In example implementations, a mobile device may obtain one or more measurements that correspond to one or more positions of the mobile device within an indoor environment. The one or more measurements that correspond to the one or more positions of the mobile device may be transmitted to one or more server devices. The one or more server devices may be enabled to produce an updated radio model based, at least in part, on the one or more measurements that correspond to the one or more positions of the mobile device within the indoor environment. However, claimed subject matter is not limited to any of these particular example implementations. Moreover, additional example radio model updating implementations are described further herein below.

FIG. 1 is a schematic block diagram 100 illustrating a mobile device within an example indoor environment in which the mobile device may be provided access to indoor environment characteristics via one or more server devices such that a location-based service may be provided according to an implementation. As illustrated, schematic block diagram 100 may include a mobile device 102 that is located within an indoor environment 104. Schematic block diagram 100 may further include one or more server devices 106, indoor environment characteristics 108, at least one wireless transmitter device 110, and at least one location-based service 112. A wired communication link 114, a wireless communication link 116, and an arrow 118 are also shown in schematic block diagram 100.

For certain example implementations, a mobile device 102 may obtain at least a portion of indoor environment characteristics 108 from one or more server devices 106. Upon receipt of indoor environment characteristics 108, mobile device 102 may store indoor environment characteristics 108 in one or more memories for use in providing at least one location-based service 112, e.g., for a user of mobile device 102. A location-based service 112 may include, by way of example only, a positioning operation or a process that may be facilitated using a position resulting from a positioning operation, as is described further herein below.

Examples of mobile devices 102 may include, but are not limited to, a mobile station, a mobile phone, a cellular phone, a netbook, a laptop, a tablet computer, a slate computer, a personal digital assistant (PDA), a personal navigation device (PND), an entertainment appliance, an e-book reader, or some combination thereof, etc., just to name a few examples. Furthermore, a mobile device 102 may comprise any mobile device with wireless communication capabilities. Example realizations for a mobile device, as well as additional mobile device examples, are described herein below with particular reference to FIG. 13. However, claimed subject matter is not limited to any particular type, size, category, capability, etc. of a mobile device.

In example implementations, indoor environment 104 may comprise one or more indoor areas such as office buildings, shopping malls, airports, apartment buildings, arenas, convention centers, auditoriums, amphitheatres, warehouses, classroom buildings, supermarkets, stadiums, a transit station terminal, a library, one or more floors thereof, interiors of other structures, or any combination thereof, just to name a few examples. In example implementations, indoor environment characteristics 108 may be descriptive of an indoor environment and may facilitate providing a location-based service 112, examples of which are described below. By way of example but not limitation, indoor environment characteristics 108 may include one or more of any of the following: a schematic map, a connectivity graph for a schematic map, a routing graph for a schematic map, annotation information for a schematic map, points of interest for an indoor environment, navigational instructions, at least one radio model, or any combination thereof, etc. Additional description and examples of indoor environment characteristics 108 are described herein below with particular reference to FIG. 4.

In example implementations, a wireless transmitter device 110 may comprise a Wi-Fi and/or WLAN AP, a femtocell nodal device, a WiMAX nodal device, a location beacon, a Bluetooth or other similarly short-ranged wireless node, or any combination thereof, etc., just to name a few examples. Wireless transmitter devices 110 may transmit signals including, but not limited to, those capable of identifying a particular wireless access device. A mobile device 102 may be within wireless communication range of one or more wireless transmitter devices 110 and thus in wireless communication with one or more wireless transmitter devices 110. A wireless transmitter device 110 may also be capable of receiving wireless signals or may comprise a wireless access device generally that is capable of transmitting and receiving wireless signals. A wireless transmitter device 110 may be located such that it is associated with and communicating within a single indoor environment 104 or multiple indoor environments 104. During wireless communication(s), a mobile device 102 may receive from one or more wireless transmitter devices 110 one or more wireless transmitter device identifiers that are respectively associated with the one or more wireless transmitter devices 110. For a Wi-Fi AP implementation of a wireless transmitter device 110, by way of example but not limitation, a wireless transmitter device identifier may comprise an AP medium access control identifier (MAC ID). Such a wireless transmitter device 110 may further interact with a mobile device 102 so as to provide other measurements or other detectable information, such as RTT measurements, RTD measurements, or RSSI measurements, etc., just to name a few examples.

As depicted in schematic block diagram 100, one or more server devices 106 may be located external to indoor environment 104. However, one or more server devices 106 may alternatively be located fully or partially internal to indoor environment 104 without departing from claimed subject matter. Similarly, although wireless transmitter device 110 is illustrated as being located internal to indoor environment 104, it may alternatively be located fully or partially external to indoor environment 104 without departing from claimed subject matter. Although only one server device 106 and wireless transmitter device 110 are explicitly shown in schematic block diagram 100, more than one of either or both may alternatively be involved in a given implementation without departing from claimed subject matter.

Also, although no particular mode of communication between mobile device 102 and one or more server devices 106 is connoted by arrow 118 interconnecting the two of them as explicitly depicted in schematic block diagram 100, it should be noted that communications between them may be made at least partially wirelessly. By way of example but not limitation, a communication between a mobile device 102 and one or more server devices 106 may be propagated wirelessly at least part of the way (e.g., via one or more wireless communication links 116 between mobile device 102 and a wireless transmitter device 110, a cellular base station, etc.) or may be propagated by wire at least part of the way (e.g., via one or more wired communication links 114 over one or more wired networks (not explicitly shown) such as an intranet, the Internet, a telephone network, etc.). As used herein, if a communication is "wirelessly received" or "wirelessly transmitted", the term "wirelessly" is intended to connote that at least a portion of a communication path from a source to a destination (e.g., between two devices) is effectuated via at least one wireless communication link. A wireless communication link in this context may comprise a first or initiating communication link, a final or terminating communication link, any one or more intermediate communication links, any combination thereof, etc., just to name a few examples.

As described above, examples of location-based services 112 may include, but are not limited to, displaying a map, positioning, personal vehicle or pedestrian navigation, providing "static" directions, providing real-time turn-by-turn directions, location-based searching (e.g., searching of local points of interest), or any combination thereof, etc. Implementing a location-based service 112 may involve using or providing any one or more of the following: a schematic map, annotation information for a schematic map, POI information, a connectivity graph, a routing graph, turn-by-turn directional instructions, "static" directional instructions from one location to another location, or any combination thereof, etc. Other examples of location-based services 112 may include, but are not limited to, routing, position filtering, incentives applications (e.g., offers based on location), or any combinations thereof, etc.

Figure 2:
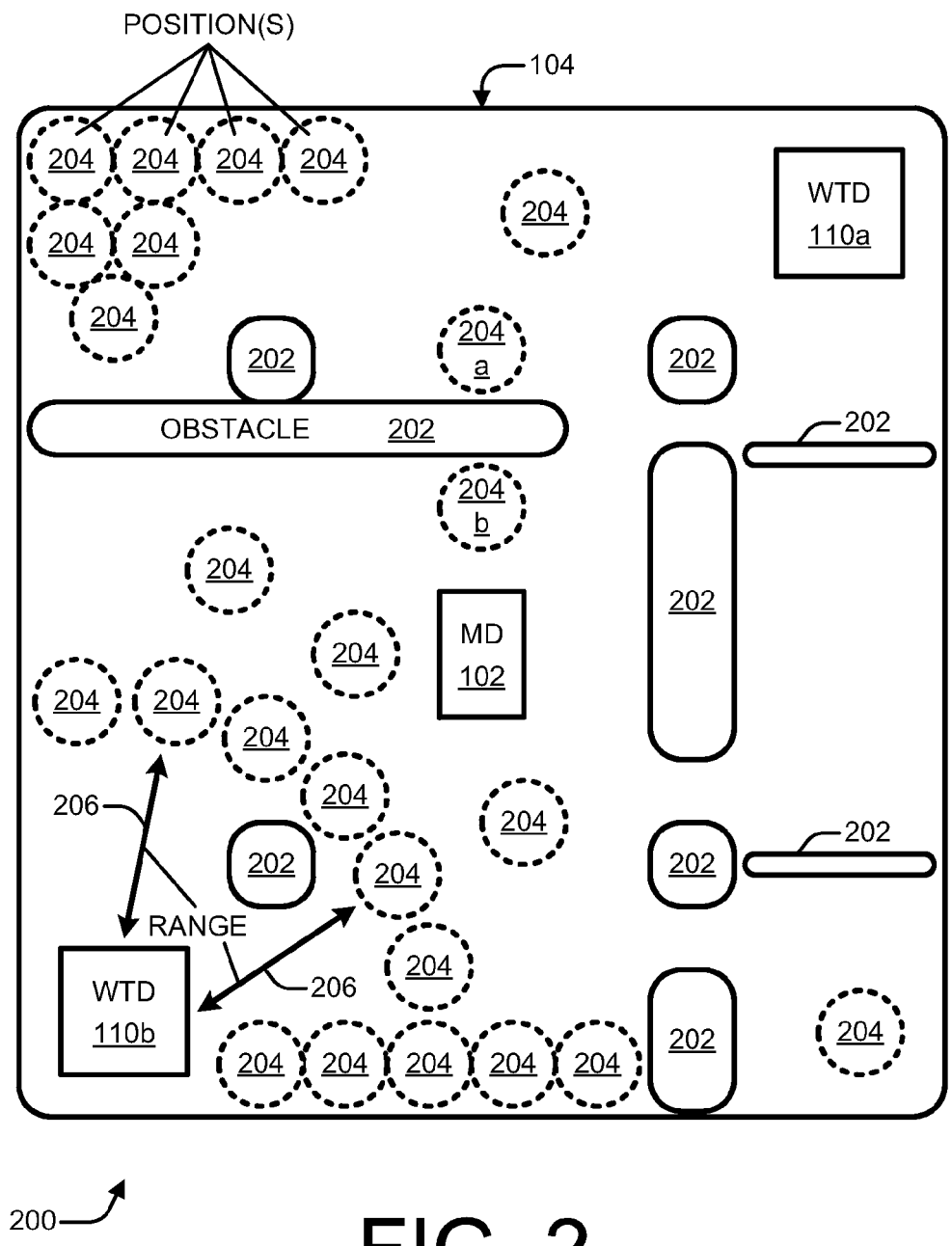
FIG. 2 is a schematic diagram of an example indoor environment, within which a mobile device may navigate, that may include multiple obstacles or a multitude of feasible positions for mobile devices according to an implementation.

FIG. 2 is a schematic diagram 200 of an example indoor environment, within which a mobile device may navigate, that may include multiple obstacles or a multitude of feasible positions for mobile devices according to an implementation. As illustrated, schematic diagram 200 may depict an example indoor environment 104 including multiple obstacles 202 or multiple positions 204. Schematic diagram 200 may also illustrate one or more ranges 206. A mobile device 102 may wirelessly communicate or navigate within indoor environment 104. Positions 204 may comprise feasible positions at which a mobile device 102 may be located or to which a mobile device 102 may navigate. Indoor environment 104 may also include one or more wireless transmitter devices 110, such as wireless transmitter device 110a or wireless transmitter device 110b. Wireless signals (not explicitly shown in FIG. 2) may be emanating from wireless transmitter device 110a or wireless transmitter device 110b of indoor environment 104.

For certain example implementations, an indoor environment 104 may include one or more obstacles 202. Obstacles 202 may include, but are not limited to, walls, doors, railings, or columns; furniture or cubicle dividers; elevators or stairs; or any combination thereof; etc. Obstacles 202 may exist in the physical world and may have corresponding representation(s) included as part of a schematic map of indoor environment 104. Although claimed subject matter is not so limited, obstacles 202 may thus include building features or other objects that may restrict movement around an indoor environment. On the other hand, indoor environments may also have open areas such as lobbies, common areas, entryways, or rooms, etc., just to name a few examples. Accordingly, because paths of movement in such an indoor environment may be restricted in some areas (although they may also be unrestricted in other, open areas), such an indoor environment may be an example of a constrained environment.

Positions 204 may comprise locations of indoor environment 104. Positions 204 may have corresponding representation(s) included as part of a schematic map of indoor environment 104. Positions 204 may also have counterpart locations in the physical world. Positions 204 may be defined to any level of granularity or scale. For example, positions 204 may be one inch, one foot, or ten feet apart, just to name a few examples. Positions 204 may also be organized or arranged in any manner. By way of example only, positions 204 may be organized into a grid of points, which may be associated with a local or global coordinate system and laid over a floor plan or other schematic map of indoor environment 104 at substantially uniform spacing. A scale of a grid of points (e.g., an interval or distance between adjacent points) may be varied based, at least in part, on a desired level of precision for positioning or other location-based services, on an available amount of resources (e.g., memory, processing, etc.), on a size of a schematic map or rooms being covered, on any combination thereof, etc. In one particular implementation, grid points may be placed or positioned at sufficiently regular intervals so as to cover, for example, at least a portion of indoor environment 104. It should be noted that grid points may extend beyond indoor environment 104, for example, while still being within a targeted service or coverage area. However, claimed subject matter is not limited to any particular implementation for positions 204.

A range 206 may comprise, by way of example only, a radial distance from a wireless transmitter device 110, with the radial distance capable of circumscribing at least a portion of a circle, such as an arc. At least one measured value (e.g., an RTT value, or an RTD value, etc.) by a mobile device 102 with respect to e.g. a wireless transmitter device 110b may enable a mobile device to estimate a range 206 between mobile device 102 and wireless transmitter device 110b, as is known in the art. An RTT may be derived from, for example, one or more communication exchanges between a mobile device 102 and one or more wireless transmitter devices 110 of indoor environment 104. An arc or circle that is specified by a range 206 may define a set of positions 204 at which a mobile device 102 is potentially located. However, a range between a mobile device and a wireless transmitter device may be estimated or used in different manners without departing from claimed subject matter.

As noted herein above, certain quantities that are measurable by a mobile device may vary at least partially in dependence on a position 204 at which a mobile device 102 is located. For example, a mobile device 102 that is located at a first position 204a may ascertain one e.g. RSSI or RTT value, but a mobile device 102 that is located at a second position 204b may ascertain another different RSSI or RTT value. For instance, a mobile device 102 at first position 204a may measure a relatively higher RSSI value as compared to an RSSI value measured by a mobile device 102 at second position 204b, e.g. with respect to wireless transmitter device 110a.

In certain example implementations, a radio model may comprise one or more positions 204 with at least a portion of positions 204 corresponding to at least one measurement made by a mobile device, at least after such a radio model is updated as described herein. Measurements may comprise, by way of example but not limitation, an RSSI value, an RTT value, an RTD value, a propagation parameter, a sensor value, or any combination thereof, etc. A radio model may cover at least a portion of a schematic map of an indoor environment 104 by comprising a grid of points laid over at least a portion of a schematic map, by linking to at least a portion of a schematic map, or any combination thereof, just to name a couple of examples. Examples of radio models are described further herein below with particular reference to FIG. 4.

Figure 3:
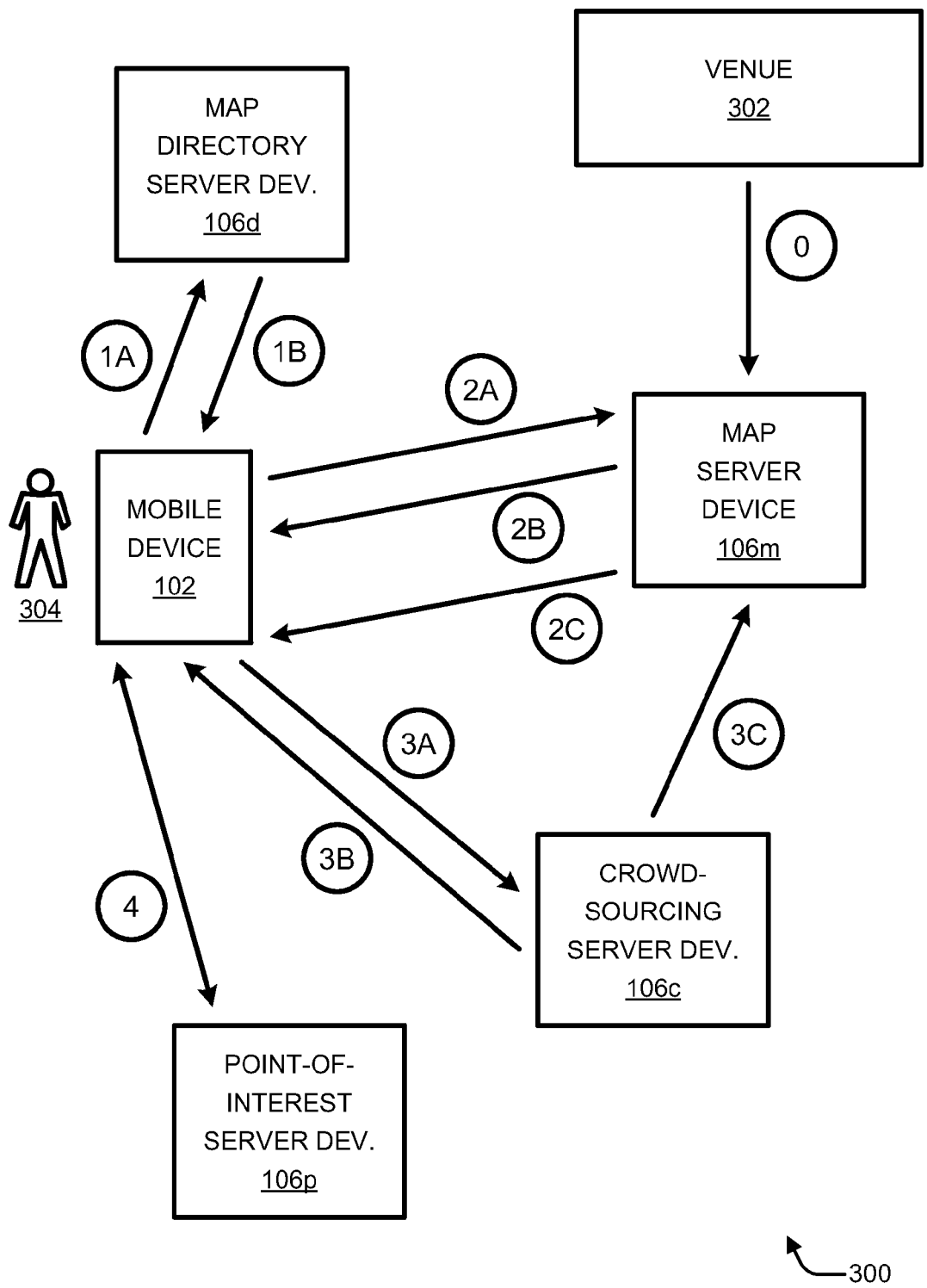
FIG. 3 is a schematic block diagram illustrating example interactions among a mobile device and one or more server devices, which may include a crowdsourcing server device, according to an implementation.

FIG. 3 is a schematic block diagram 300 illustrating example interactions among a mobile device and one or more server devices, which may include a crowdsourcing server device, according to an implementation. As illustrated, schematic block diagram 300 may include at least one mobile device 102, one or more server devices 106, at least one venue 302, or at least one user 304. A mobile device 102 may interact with one or more server devices 106. A venue 302 may also interact with at least one server device 106.

For certain example implementations, one or more server devices 106 may be realized as multiple server devices 106. Examples of server devices 106 may include, but are not limited to, a map directory server device 106d, a map server device 106m, a crowdsourcing server device 106c, a POI server device 106p, or any combination thereof, etc. Example realizations for a server device, as well as additional server device examples, are described herein below with particular reference to FIG. 12. In example implementations, a system or an apparatus may comprise, by way of example but not limitation, a distributed system or a distributed apparatus that includes multiple server devices. Example interactions between mobile device 102 and at least one server device 106 that are shown in schematic block diagram 300 include interactions (1A), (1B), (2A), (2B), (2C), (3A), (3B), (3C), or (4). An example interaction (0) is also shown between venue 302 and map server device 106m.

Venue 302 may refer to an indoor environment where, e.g., indoor navigation service is deployed. A venue may refer to a physical place or locale that may be associated with the whereabouts of an object or thing (e.g., a user, or a mobile device, etc.) according to a desired or suitable point of reference represented, for example, via geographic coordinates (e.g., latitude, longitude, etc.), a street address, a governmental jurisdiction, a postal zip code, a name, or any combination thereof, etc. Additionally or alternatively, a venue may also include references to an altitude, a time, a direction, a distance, or any combination thereof, etc., just to illustrate other possible implementations. Of course, these are merely examples of venues, and claimed subject matter is not limited in these respects. Depending on an implementation, venues may comprise, for example, various partially or substantially enclosed areas associated with an indoor environment 104, as described herein above. A venue 302 may make indoor environment characteristics 108 available for access. For example, a venue 302 may provide a schematic map of its indoor environment, together with locations of wireless transmitter devices. An interaction (0) may occur offline, for instance. More specifically, at an example interaction (0), venue 302 may provide one or more schematic maps or other indoor environment characteristics to map server device 106m.

Examples of mobile device 102, which may interact with a user 304, are described herein above with particular reference to FIG. 1. Mobile device 102 may perform a positioning operation and determine a position of mobile device 102. A determined position may be displayed to user 304 in conjunction with at least a portion of a displayed schematic map. Mobile device 102 may interact with one or more functional server devices to gather parameters that may be used to provide a location-based service.

Map directory server device 106d may include a data structure, such as a database, that links or otherwise associates information indicative of an approximate location with one or more network locations storing a schematic map or other characteristics of an indoor environment that correspond to the approximate location. Map directory server device 106d may, for example, direct a mobile device 102 to a server device (e.g., a map server device 106m) that stores schematic maps or wireless transmitter device locations for a given venue 302. A map server device 106m may be located at a public uniform resource locator (URL) (e.g., that may be generally accessible to a mobile device), or it may be a location server that is deployed by a communication network operator (e.g., an enhanced serving mobile location center (E-SMLC)). However, a map directory server device 106d may be implemented differently without departing from claimed subject matter. In an example alternative, use of map directory server device 106d may be obviated by employing a text or menu-based mechanism on mobile device 102 that enables user 304 to identify a location that is sufficiently precise that a local or web-based application may direct mobile device 102 to a map server device 106m.

Map server device 106m may store characteristics for multiple indoor environments, e.g., in a database. For example, map server device 106m may host one or more schematic maps or other indoor environment characteristics for a venue 302. Mobile device 102 may therefore acquire indoor schematic maps from map server device 106m, e.g. after authentication. An interface between mobile devices and map server device 106m may be specified individually or standardized to enable a schematic map exchange. Map server device 106m may also provide location(s) of wireless transmitter devices for a venue 302. Alternatively, a separate server device, such as a server device dedicated to providing locations of wireless transmitter devices at venues, may provide locations of wireless transmitter devices to mobile devices. However, a map server device 106m may be implemented differently without departing from claimed subject matter.

Crowdsourcing server device 106c may include logic to update characteristics of an indoor environment based, at least in part, on at least one measurement received from one or more mobile devices. For example, crowdsourcing server device 106c may collect measurements from a number of mobile devices at a given venue 302. Measurements may be accumulated and used to update, e.g., radio models or probability maps. Crowdsourcing server device 106c may collect, by way of example only, measurements attained via active or passive communications with Wi-Fi or femtocell nodes or other available measurements, such as SPS readings, cell identifiers, sensor readings, or any combinations thereof, etc. If a radio model is updated, crowdsourcing server device 106c may send it to map server device 106m so that other mobile devices may benefit from the updated radio model after map server device 106m sends it to them. Alternatively, crowdsourcing server device 106c may communicate directly with one or more mobile devices and send an updated radio model to at least one mobile device. However, a crowdsourcing server device 106c may be implemented differently without departing from claimed subject matter.

POI server device 106p may include a data structure, such as a database, that links or otherwise associates an identifier (e.g., a location context identifier) of a venue 302 to POI information. POI information, examples of which are described herein above, may be descriptive of attributes of a given indoor environment. A POI server device 106p may therefore store POI information for one or more venues 302. An indoor position as estimated by a mobile device 102 may be used to trigger a location-based service. To facilitate provisioning a location-based service, a mobile device 102 may communicate with POI server device 106p to acquire POI information that is relevant to locations that are proximate to a current position, e.g., by including a location context identifier as well as an estimated current position in a request for POI information. However, a POI server device 106p may be implemented differently without departing from claimed subject matter.

For certain example implementations, communication scenarios may be expressed in terms of interactions between or among different entities illustrated in schematic block diagram 300. Example scenarios for interactions (1A), (1B), (2A), (2B), (2C), (3A), (3B), (3C), and (4) are described below. However, claimed subject matter is not limited to any particular example scenarios or interactions thereof.

At example interaction (1A), mobile device 102 may send a request to map directory server device 106d that includes information indicative of an indoor environment 104 in which mobile device 102 is currently located. For example, at least one rough location or location hint may be sent from mobile device 102 to map directory server device 106d. Examples of location hints may include, but are not limited to, an identifier associated with a wireless transmitter device that is in wireless communication range, most-recently-received SPS coordinates, or any combination thereof, etc.

At example interaction (1B), map directory server device 106d may send information to mobile device 102 that enables mobile device 102 to retrieve at least a portion of indoor environment characteristics 108 (e.g., of FIGS. 1 and 4) for an indoor environment 104 (e.g., of FIGS. 1 and 2) of a venue 302. For example, map directory server device 106d may send a location context identifier to mobile device 102 in response to a request. By way of example only, a uniform resource locator (URL), a universal resource indicator (URI), or a combination thereof, etc. that identifies a server or a location on a server device (e.g., map server device 106m, a location on map server device 106m, or a combination thereof, etc.) having indoor environment characteristics may be sent to mobile device 102 from map directory server device 106d. Additionally or alternatively, a local wireless transmitter device may broadcast a URL or a URI, or a user 304 of mobile device 102 may search for a URL or a URI via an application or web interface.

At example interaction (2A), mobile device 102 may send a request for indoor environment characteristics to map server device 106m using e.g. an identifier, such as a URL or URI that is received from a map directory server device 106d with interaction (1B). At example interaction (2B), map server device 106m may send at least a schematic map of a venue 302 to mobile device 102 responsive to a URL, URI, or other information that indicates a particular indoor environment of venue 302. Map server device 106m may also send locations of wireless transmitter devices to mobile device 102 separately or along with a schematic map.

At example interaction (2C), map server device 106m may send additional indoor environment characteristics to mobile device 102 to facilitate navigation or another location-based service. By way of example only, at least one radio model may be sent from map server device 106m to mobile device 102. Radio models are described further herein with particular reference to FIGS. 2 and 4.

At example interaction (3A), crowdsourced information may be sent from mobile device 102 to crowdsourcing server device 106c. For example, one or more measurements ascertained by a mobile device 102 may be sent. Additionally, at least one measurement along with a position of a mobile device 102 at which the at least one measurement was ascertained may be sent from mobile device 102 to crowdsourcing server device 106c. A measurement may further be sent from mobile device 102 in conjunction with a location context identifier of an indoor environment 104 of a venue 302. Crowdsourcing server device 106c may use one or more measurements received from one or more mobile devices 102 to update a radio model with additional or more current information. Example approaches to updating radio models are described herein below with particular reference to FIG. 6.

At example interaction (3B) or (3C), crowdsourcing server device 106c may disseminate an updated radio model. For example, crowdsourcing server device 106c may transmit an updated radio model to a mobile device 102 at interaction (3B). A mobile device 102 that receives an updated radio model may be a mobile device that provided at least one measurement on which a radio model updating was based or may be a different mobile device. Additionally or alternatively, crowdsourcing server device 106c may transmit an updated radio model to a map server device 106m at interaction (3C). Consequently, map server device 106m may provide an updated radio model to mobile devices thereafter (e.g., as part of an interaction (2C)). An updated radio model may be transmitted from crowdsourcing server device 106c in conjunction with e.g. a location context identifier of an indoor environment 104 of a venue 302.

At example interaction (4), a mobile device 102 may retrieve POI information from a POI server device 106p. For example, an application on a mobile device 102 may access POI server device 106p to request POI information for an indoor environment 104 of a venue 302. A request for POI information may also include a current estimated position.

As indicated above, one or more of map directory server device 106d, map server device 106m, crowdsourcing server device 106c, or POI server device 106p may be realized separately or jointly on one or more server devices. Furthermore, map directory server device 106d, map server device 106m, crowdsourcing server device 106c, or POI server device 106p, as well as functionalities thereof, may be owned, operated, or managed, etc. by a single entity or by multiple entities. By way of example only, an operator of a crowdsourcing server device 106c may be separate from or the same as an operator of map server device 106m. However, claimed subject matter is not limited to any particular arrangement, ownership, or management of one or more server devices 106.

Figure 4:
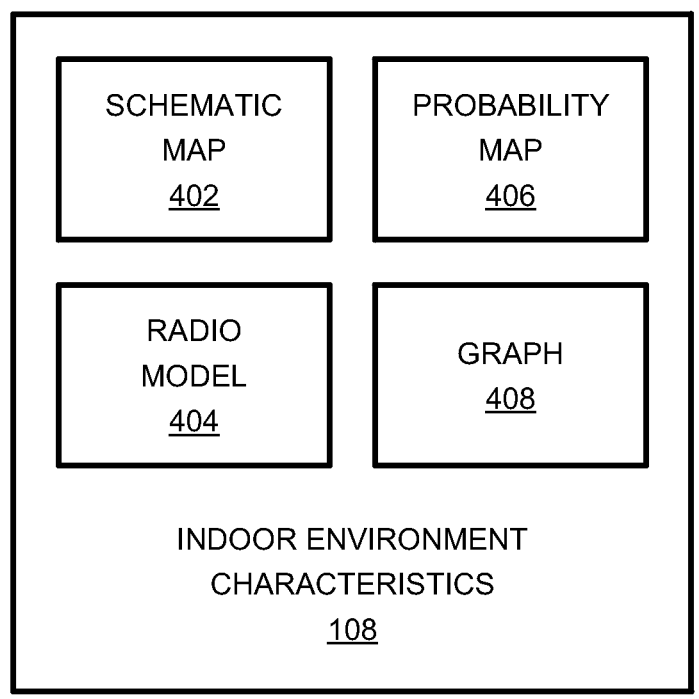
FIG. 4 is a block diagram of example indoor environment characteristics, which may include a radio model, according to an implementation.

FIG. 4 is a block diagram 400 of example indoor environment characteristics, which may include a radio model, according to an implementation. As illustrated, indoor environment characteristics 108 may include, by way of example but not limitation, at least one schematic map 402, at least one radio model 404, at least one probability map 406, at least one graph 408, or any combination thereof, etc. As described herein above with particular reference to FIG. 1, indoor environment characteristics 108 may correspond to at least one indoor environment 104. Although shown separately in FIG. 4, one or more of schematic map 402, radio model 404, one probability map 406, or graph 408, etc. may alternatively be realized in another form, such as an integrated, joint, overlapping, or any combination thereof, etc. form.

For certain example implementations, schematic map 402 may comprise information descriptive of a layout or physical organization of at least one indoor environment 104. For example, schematic map 402 may indicate locations of walls, rooms, doors, hallways, dividers, railings, or portals between floors, etc. Indoor environment characteristics 108 may further include a graph 408. For certain example implementations, a graph 408 may comprise multiple nodes that are interconnected by edges. To create a graph 408, a grid of points may be overlaid on a schematic map of an indoor environment and lines interconnecting the points may be drawn, by way of example only. A connectivity graph implementation of a graph 408 may be created, for example, by limiting interconnecting lines to those lines that are capable of extending from one point to another point without crossing an obstacle, such as an impervious building feature (e.g., a wall). A routing graph implementation of a graph 408 may comprise a connectivity graph that includes additional map information corresponding to indoor environment 104 so as to facilitate a determination of a route from one point to another point of indoor environment 104.

A connectivity graph or a routing graph may be linked to or otherwise associated with annotation information (not separately shown). A connectivity graph, a routing graph, or annotation information may be included as part of, may be linked to, or may otherwise be associated with a schematic map 402. Annotation information may comprise POI information, as described herein above, or other information descriptive of attributes of specific locations or aspects of a schematic map 402 or a physical indoor environment to which it corresponds. However, claimed subject matter is not limited to any particular example implementation of a schematic map, a graph, or POI information, etc.

A connectivity graph, a routing graph, or annotation information may be used to provide navigation services, such as positioning, providing static directions, providing turn-by-turn directions, or any combination thereof, etc. A navigation service may facilitate travel from a point "A" to a point "B" of e.g. an indoor environment using, for example, a routing graph. A routing graph may be descriptive of feasible areas of a given schematic map and indicate how traversal is possible from one position to another position. For a given indoor environment, a routing graph may comprise a set of nodes and edges that depict feasible areas and traversable paths from one point in an indoor environment to another point. A traversable path may comprise, by way of example but not limitation, a path between any two points that is not blocked by a wall or other obstacle. By way of example but not limitation, annotations may be associated with particular portion(s) of a routing graph. A routing graph may be used to plot a path from one point to another point, including from one annotated area to another annotated area.

For certain example implementations, at least one graph 408 may be updated using one or more crowdsourcing techniques as described herein. In an example implementation, a crowdsourcing server device 106c may update a connectivity or routing graph based, at least in part, a position of a mobile device or at least one measurement that is made with regard to a position of the mobile device. For instance, there may be a door in a wall that is not shown in a schematic map. A door that is not shown in a map is likely not reflected in a corresponding connectivity or routing graph. By observing mobile device(s) of users that appear to move through a wall, a crowdsourcing server device 106c may infer or conclude that a door is actually present there in the wall. Consequently, a crowdsourcing server device 106c may update (e.g., modify) a connectivity graph or a routing graph. A crowdsourcing server device 106c may also update a schematic map 402, a probability map 406, or any combination thereof, etc. in response to such a conclusion. Example approaches to updating radio models or graphs with regard to crowdsourcing techniques are described herein below with particular reference to FIG. 5. Example approaches to updating at least graphs with regard to crowdsourcing techniques are described herein below with particular reference to FIGS. 9-11.

A probability map 406 may comprise one or more likelihood values that correspond to one or more positions of an indoor environment. For example, at least one likelihood value may correspond to one or more positions 204 of an indoor environment 104 (e.g., of FIG. 2). A probability distribution or density may, for example, indicate one or more likelihoods of being in a particular state given a previous state. In one particular example, such a state may be defined at least in part by location and velocity (e.g., a speed and direction). A probability distribution or density may be used to determine likelihood values. A likelihood value may express a likelihood, e.g. in probabilistic terms, that a mobile device 102 is located at or is to transition to a given position 204 based on parameters corresponding to mobile device 102 for at least one prior epoch (e.g., at least an immediately prior epoch). Such parameters may characterize position, movement, etc. of a mobile device at an instantaneous moment or over an elapsed time period. Examples of parameters characterizing position or movement of a mobile device may include, but are not limited to, an estimated position, a speed, a direction, a trajectory over an elapsed time period, or any combination thereof, etc. By way of example only, a probability map may correspond to an indoor environment and include multiple indications of likelihoods of mobile devices moving to or being located at various positions of the indoor environment based on a movement or location history of a mobile device.

A mobile device 102 may use likelihood values of a probability map 406, by way of example but not limitation, to establish or adjust a position fix. For example, if other positioning techniques or measured values result in a set of likely positions, the set of likely positions may be limited by identifying one or more positions in the set of likely positions having greater likelihood value(s) based at least in part on a probability map 406 as compared to one or more other positions in the set of likely positions. For instance, a mobile device may consider a position, a direction, or a speed at a previous moment (e.g., from a previous state) in conjunction with probability map 406 to determine one or more positions at which the mobile device is more probably positioned at a current moment (e.g., at a current state). These more probable positions that are determined at least partly based on probability map 406 may be used to limit the set of likely positions of the mobile device. Probability map 406 may include a map of an indoor environment 104 to which it corresponds. Additionally or alternatively, probability map 406 may reference positions 204 that are defined or otherwise specified in a map that is included as part of, e.g., schematic map 402. However, claimed subject matter is not limited to any particular implementation of a probability map.

Using instantaneous positions or tracked movement parameters of mobile devices, which may be received directly from such mobile devices, a crowdsourcing server device 106c (e.g., of FIGS. 3 and 6) may update a probability map 406 to produce an updated probability map (not explicitly shown). For example, a crowdsourcing server device 106c may adjust likelihood values of a probability map 406 based on where mobile devices are positioned over time or how mobile devices move (e.g., how positions, velocities, trajectories, or combinations thereof, etc. change over time) in an indoor environment. Mobile device positions may be determined, for example, using known trilateration-based techniques or using a radio model, such as radio model 404. With trilateration, for instance, a mobile device may use a mathematical formula or a look-up table that may define a functional relationship between received wireless signal characteristics (e.g., RSSI, RTT, RTD, etc.) and a range to one or more wireless transmitter devices. An updated probability map may be disseminated by crowdsourcing server device 106c directly to mobile devices 102 or indirectly to mobile devices 102 by transmitting an updated probability map to a map server device 106m. Example approaches to updating radio models or probability maps with regard to crowdsourcing techniques are described herein below with particular reference to FIG. 6.

A radio model 404 may comprise one or more values that are derived from at least one measurement at an indoor environment. A measurement may correspond to at least one position of an indoor environment. For example, a measurement may be ascertained by a mobile device at a corresponding position of an indoor environment. Additionally or alternatively, a measurement may correspond to one or more positions located at a given range (e.g. radial distance) from at least one wireless transmitter device. Although multiple example implementations of radio models 404 are described below, claimed subject matter is not limited to any of these particular examples. Instead, various implementations may include more, fewer, or different aspects or features than those described below. For certain example implementations, a radio model 404 may comprise one or more values, including but not limited to patterns of values, that are derived from at least one measurement obtained at an indoor environment. A radio model 404 may therefore represent, or include values characteristic of, a radio environment for an indoor environment 104 to which it corresponds.

In an example implementation for radio models 404, a radio model may comprise at least one expected value for measurements at multiple positions of an indoor environment. By way of example only, such positions may be organized or stored as a grid covering at least a portion of an indoor environment. For each grid point, at least one expected measurement value may be stored. By way of example only, multiple expected measurement values forming a pattern of expected values may be stored for each grid point. Expected measurement values may correspond to, for example, RSSI measurements, RTT measurements, RTD measurements, sensor value measurements, or any combination thereof, etc. An expected measurement value may be derived from one or more actual measurements. Alternatively, an expected measurement value may be derived at least initially by simulation using, for example, a ray tracing or similar technique that predicts signaling, timing, or other characteristics of wireless signals within a modeled indoor environment. An expected measurement value may comprise, for example, an expected value plus some range (e.g., a statistical range, a probabilistic range, an error range, or any combination thereof, etc.) around the expected value that is derived from one or more actual measurements at multiple grid points. For instance, an expected measurement value may comprise a mean plus a standard deviation. However, claimed subject matter is not limited to these particular examples for expected measurement values.

Expected measurement values for an example radio model 404 may be stored in a data structure for use by a mobile device in attaining or fine tuning a position fix within an indoor environment. In an example positioning operation, a mobile device may ascertain one or more radio measurements (e.g., of RTT, RTD, RSSI, or sensor values, etc.). One or more ascertained radio measurements may be compared to values, including value patterns, in a data structure of a radio model 404. Using one or more comparisons or a pattern matching algorithm, for example, a mobile device may determine expected values in a data structure of a radio model 404 that match one or more ascertained radio measurements. A position associated with the matched values in the data structure may be determined to be an estimated position of the mobile device within an indoor environment.

By way of example only, a radio model 404 may be considered to comprise a map of values derivable from measurements if such values are organized in accordance with positions of an indoor environment (e.g., organized into a grid of points or the like). Hence, a radio model 404 may comprise an RSS map, an RTT map, an RTD map, a sensor value map, or any combination thereof, etc. A radio model 404 may therefore include, by way of example but not limitation, a map of an indoor environment 104 to which it corresponds. Additionally or alternatively, a radio model 404 may reference positions 204 that are defined or otherwise specified in a map that exists separately (e.g., that is stored or is transmitted, etc. separately), such as a schematic map 402. However, claimed subject matter is not limited to any particular organization or arrangement for a radio model 404.

In an example implementation of a radio model 404, an RSS map may comprise values that are derived from at least one RSS measurement for one or more positions of a corresponding indoor environment. An RSS measurement value may be ascertained (e.g., made, or taken, etc.) by a mobile device by, for example, measuring a strength of a wireless signal received from a wireless transmitter device. In an example implementation of a radio model 404, an RTT map may comprise values that are derived from at least one RTT measurement for one or more positions of a corresponding indoor environment. An RTT measurement value may be ascertained (e.g., made, or taken, etc.) by a mobile device by, for example, measuring a time for a wireless signal to be transmitted from the mobile device and a companion wireless signal from a wireless transmitter device to be received back at the mobile device, or vice versa.

In an example implementation of indoor environment characteristics 108, a radio model 404 or a separate sensor model (not explicitly shown) may comprise a sensor value map that includes values derived from at least one sensor measurement for one or more positions of a corresponding indoor environment. A sensor measurement value may be ascertained (e.g., made, or taken, etc.) by a mobile device by, for example, measuring at least one value using one or more sensors of a mobile device. At least one sensor measurement value may be obtained at a position corresponding thereto by a mobile device with one or more sensors. At least one sensor value may comprise a temperature ascertained by a thermometer, a pressure ascertained by a barometer, an acceleration ascertained by an accelerometer, a compass heading ascertained by a compass, a gyroscope heading ascertained by a gyroscope, or any combination thereof, etc. By way of example only, one or more sensor measurements may be fed into a filtering mechanism together with one or more measurements pertaining to radio characteristics. Sensor measurements and radio characteristic measurements may be evaluated singularly or jointly against a sensor measurement model or a radio measurement model. Results of such an evaluation may be used as at least part of a positioning operation.

In another example implementation for radio models 404, a radio model may comprise at least one expected value for measurements at multiple positions of an indoor environment. By way of example only, a radio model 404 may store in a data structure expected values of measurements that indicate an expected range to at least one wireless transmitter device. Alternatively, a radio model 404 may provide one or more functions that characterize expected measurement values for various ranges between mobile devices and a given wireless transmitter device. Expected measurement values may correspond to, for example, RSSI measurements, RTT measurements, RTD measurements, or any combination thereof, etc. An expected measurement value may be derived from one or more actual measurements. Alternatively, an expected measurement value may be derived at least initially by simulation using, for example, a ray tracing or similar technique that predicts signaling, timing, or other characteristics of wireless signals within a modeled indoor environment. Expected measurement values in a radio model 404 may therefore indicate, for example, probable positions in an arc or circle as defined by a radial distance or range from a particular wireless transmitter device.

With an example radio model 404, expected measurement values, including patterns thereof, may be stored in a data structure in association with expected ranges to a particular wireless transmitter device. In an example positioning operation, a mobile device may ascertain one or more radio measurements (e.g., of RTT, RTD, RSSI, etc.). One or more ascertained radio measurements may be compared to expected measurement values, including patterns of expected measurement values, in a data structure of a radio model 404. Using one or more comparisons or a pattern matching algorithm, for example, a mobile device may determine expected values in a data structure of a radio model 404 that match one or more ascertained radio measurements. A radial distance from a particular wireless transmitter device may be stored in association with the matching values of the data structure. Alternatively, a mobile device may use a function, and any associated coefficients, as provided by radio model 404 to compute a radial distance based, at least in part, on the one or more ascertained radio measurements. A set of positions within an indoor environment that are defined by a radial distance or range from the particular wireless transmitter device (e.g., as looked up in table, or computed from a function, etc.) may be determined to be one or more estimated positions of the mobile device within an indoor environment.

Figure 5:
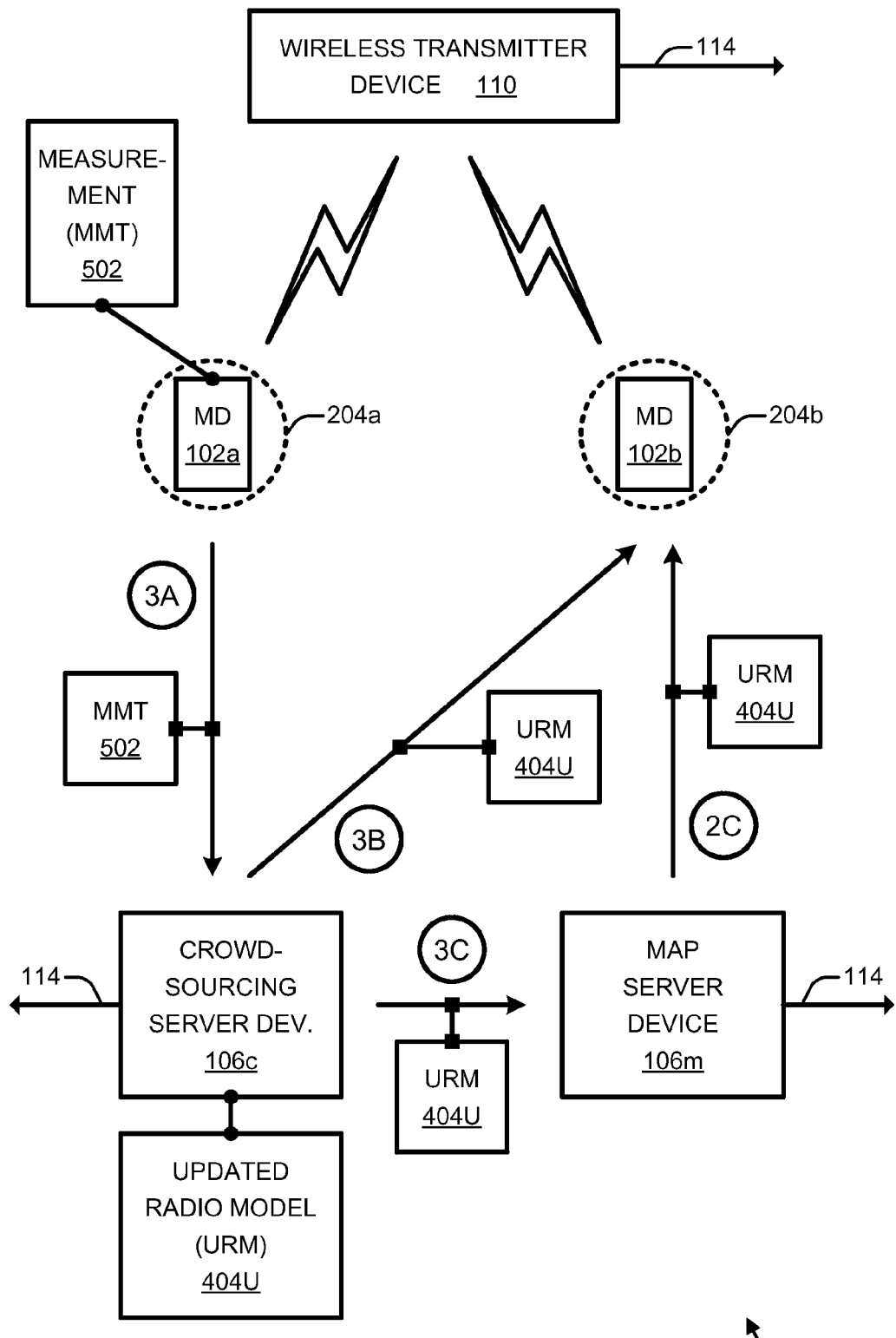
FIG. 5 is a schematic block diagram illustrating example interactions among multiple mobile devices and at least a crowdsourcing server device to provide an updated radio model according to an implementation.

FIG. 5 is a schematic block diagram 500 illustrating example interactions among multiple mobile devices and at least a crowdsourcing server device to provide an updated radio model according to an implementation. As illustrated, schematic block diagram 500 may include a first mobile device 102a, a second mobile device 102b, a wireless transmitter device 110, a crowdsourcing server device 106c, a map server device 106m, or one or more wired communication links 114. Schematic block diagram 500 may also include a first position 204a, a second position 204b, an updated radio model 404U, or at least one measurement 502. Schematic block diagram 500 may further include one or more interactions (3A), (3B), (3C), or (2C).

For certain example implementations, an operational scenario is described. First mobile device 102a may be located at first position 204a, e.g., within an indoor environment. First mobile device 102a may ascertain at least one measurement 502. By way of example only, measurement 502 may comprise at least one RSSI value, at least one RTT value, at least one RTD value, one or more sensor values, or any combination thereof, etc. An RSSI value, an RTT value, or an RTD value may be measured, for instance, receiving from or transmitting to a wireless transmitter device 110.

At example interaction (3A), first mobile device 102a may wirelessly transmit measurement 502 that corresponds to first position 204a to crowdsourcing server device 106c. Thus, crowdsourcing server device 106c may receive measurement 502 that corresponds to first position 204a from first mobile device 102a. Crowdsourcing server device 106c may update a radio model 404 (e.g., of FIG. 4) to produce an updated radio model 404U based, at least partly, on measurement 502 that corresponds to first position 204a.

In example implementations, crowdsourcing server device 106c may update a radio model 404 (e.g., of FIG. 4) to produce an updated radio model 404U. A crowdsourcing server device 106c may update a radio model 404 (or a probability map 406 or a graph 408), for example, based, at least in part, on a measurement 502 corresponding to a first position 204a that is received from a first mobile device 102a (or based, at least in part, on a known or determinable first position 204a). For example, crowdsourcing server device 106c may update an expected measurement value corresponding to first position 204a of a radio model data structure based, at least in part, on measurement 502. For instance, a mean or a standard deviation expected value of a radio model 404 may be updated using measurement 502.

Measurements 502 may be used in a crowdsourced updating procedure in any one or more of a number of different manners. However, claimed subject matter is not limited to any of these particular example updating procedures. For example, received measurements 502 may be filtered to produce updated values that are relatively more current, that are relatively more pertinent to more users, that reject spurious measurements, that ascertain a statistically relevant value (e.g., by determining an average, by determining a mean plus standard deviation, or some combination thereof, etc.), or combinations thereof, etc. Stored expected measurement values may be kept relatively current by applying at least one time decay to received measurements such that older measurements are given a lower weight as compared to newer measurements. Additionally or alternatively, a weighted average may be applied to measurements. For instance, measurements taken by or received from relatively more common types, brands, or models of mobile devices may be given greater weight as compared to those measurements taken by or received from relatively less common types, brands, or models of mobile devices.

Updating of radio models 404 by a crowdsourcing server device 106c may be implemented, by way of example only, in accordance with a known or inferred reliability of crowdsourced information (e.g., to handle potentially spurious measurements). For example, if a particular mobile device 102 submits multiple measurements for different positions that substantially deviate from existing expected measurement values (e.g., that consistently exceed one or two standard deviations), measurements received from that particular mobile device 102 may be de-weighted in (including being omitted from) a radio model updating procedure inasmuch as the measurements may be considered insufficiently reliable. If a particular faulty or unreliable mobile device, which may be identified by a unique identifier (e.g., a phone number, an associated email account, an International Mobile Subscriber Identity (IMSI) number, or any combination thereof, etc.) submits measurements, such measurements may be de-weighted in a radio model updating procedure. If a particular brand or model of mobile device 102 is known to make faulty or unreliable measurements (e.g., faulty or unreliable measurements generally or faulty or unreliable measurements of a particular kind, such as RSSI or RTT), measurements received from such mobile devices may be de-weighted in a radio model updating procedure as being considered insufficiently reliable.

As another example of an updating procedure, crowdsourcing server device 106c may batch measurements received from mobile devices until a statistically significant number of measurements have been received. For instance, crowdsourcing server device 106c may wait to update expected measurements corresponding to one or more positions until five "new" measurements or three percent of a current sample set of measurements are received from mobile devices for the corresponding one or more positions. Also, crowdsourcing server device 106c may normalize or calibrate measurements received from mobile devices prior to using them to update a radio model. For instance, if a given brand or model of mobile device is known to skew higher than average for RTT calculations by a certain amount of time, crowdsourcing server device 106c may adjust RTT measurements received from such mobile devices downward to account for the known certain amount of time.

As another example, crowdsourcing server device 106c may receive measurements from mobile devices that differ at different times of the day or different days of the week. For instance, operational office machines may affect signal characteristics during business hours. Busy times of the day or days of the week may also result in mutual interference among mobile devices. For instance, there may be different signal characteristics on Monday at 11 am as compared to Saturday at 8 pm. Accordingly, a crowdsourcing server device 106c may not utilize measurements by mobile devices that are made during the evening or nights when fewer activities or mobile devices are present. Additionally or alternatively, a radio model 404 (or probability map 406) may be conditioned (e.g., made dependent or segmented) by times of the day or days of the week. Equivalently, multiple respective radio models may correspond to multiple respective segments of times of days or days of the week. For instance, a radio model may be segmented into two (or more) periods—e.g., business hours or non-business hours. Accordingly, a crowdsourcing server device 106c may segment updating procedures for a radio model by times of the day or days of the week. Measurements taken during one period may be used to update a segment of a radio model corresponding to that period but not used to affect a segment of the radio model corresponding to another segment or segments.

A radio model 404 (or probability map 406 or graph 408) may thus be implemented using a conditional model that is based, at least partially, on one or more situational characteristics. Examples of situational characteristics may include, but are not limited to, a mobile device type, brand, or model; a time of day or day of week; a desired level of precision; or any combination thereof; etc. For example, a mobile device may employ a particular radio model or segment thereof based, at least in part, on one or more conditions. Such conditions may include, but are not limited to, a type, brand, or model of mobile device; a desired level of positioning precision; a time of day, a day of the week, or a time of year; or any combination thereof; etc. For instance, with a segmented radio model, a mobile device may employ a segment corresponding to a current day or current time if using the segmented radio model to perform a positioning fix. Additionally or alternatively, a mobile device may extract from a radio model a position that is associated with a pattern of expected measurement values, with the pattern being dependent on a condition. For instance, expected measurement value patterns may differ at noon on Tuesday morning as compared to 4 pm on Friday afternoon. By obtaining crowdsourced measurements from mobile devices under different conditions, a crowdsourcing server device 106c may create or update a radio model 404 or a probability map 406 in accordance with different conditions to implement a conditional model for a radio model 404 or a probability map 406. However, claimed subject matter is not limited to conditional models or any particular example implementations for conditional models.

At example interaction (3B) or (3C), crowdsourcing server device 106c may transmit updated radio model 404U. For example, crowdsourcing server device 106c may transmit updated radio model 404U to second mobile device 102b at interaction (3B). Additionally or alternatively, crowdsourcing server device 106c may transmit updated radio model 404U to map server device 106m at interaction (3C).

At example interaction (2C), map server device 106m may transmit updated radio model 404U to second mobile device 102b. Thus, second mobile device 102b may wirelessly receive from one or more server devices (e.g., from crowdsourcing server device 106c at interaction (3B) or from map server device 106m at interaction (3C), etc.) updated radio model 404U that is updated based, at least in part, on at least one measurement 502 that corresponds to first position 204a.

Second mobile device 102b may perform a positioning operation using updated radio model 404U, e.g., within an indoor environment. For example, second mobile device 102b may perform one or more comparisons or a pattern matching operation using its own measurements and expected measurement values obtained from updated radio model 404U. Second mobile device 102b may be located at second position 204b. In one example, an updated radio model 404U may include updated measurement values that were previously received by crowdsourcing server device 106c for second position 204b. In another example, as second mobile device 102b moves around an indoor environment, second mobile device 102b may use updated radio model 404U (which was updated based, at least in part, measurement 502) in a positioning operation to determine that it has moved to first position 204a.

In certain example implementations, a mobile device 102 may additionally or alternatively wirelessly receive from one or more server devices 106 at least one updated probability map. A probability map 406 (e.g., of FIG. 4) may be updated based, at least in part, on at least one measurement that corresponds to at least one position of one or more other mobile devices within an indoor environment.

In certain example implementations, a position 204 (e.g., a first position 204a or a second position 204b) may comprise a known location of an indoor environment. A known location may be ascertained, for instance, via participation in a transaction that is determinable to occur at the known location within the indoor environment.

Figure 6:
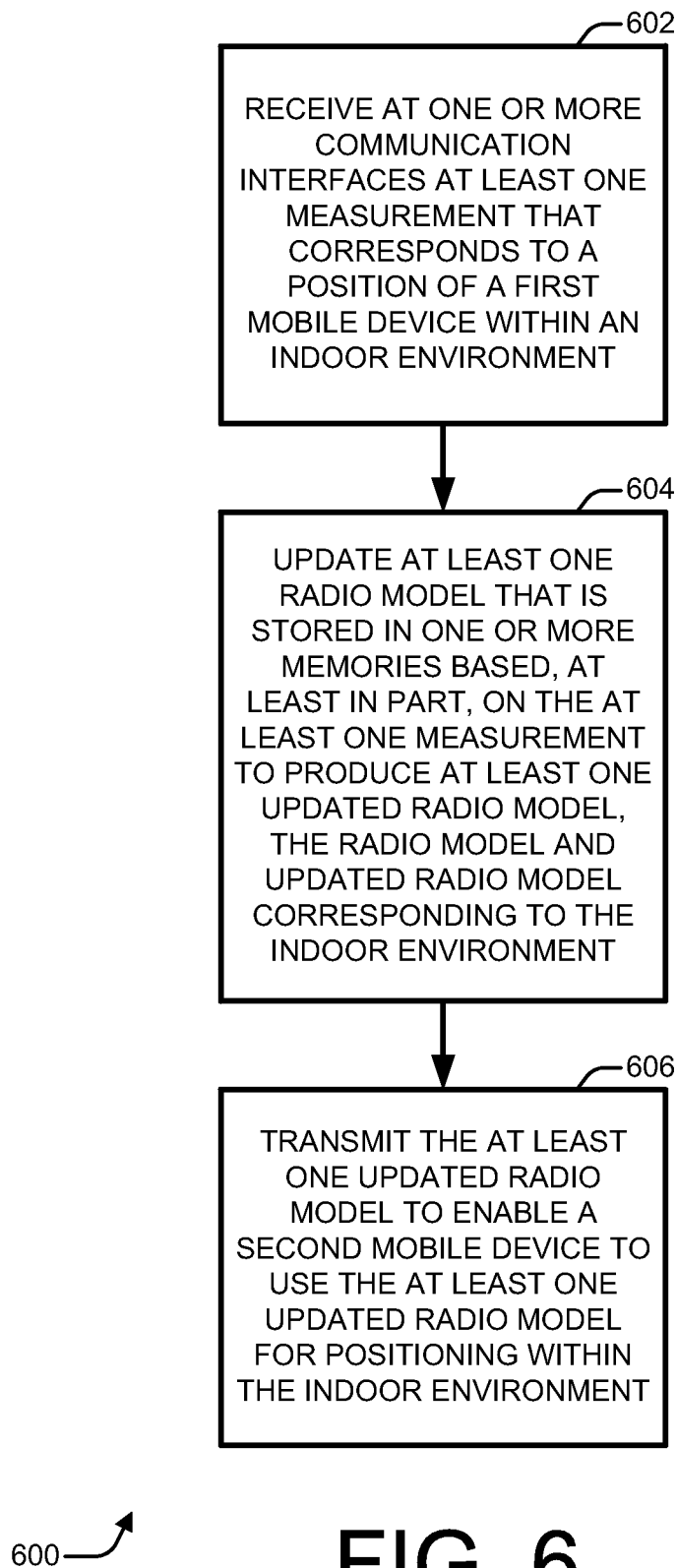
FIG. 6 is a flow diagram illustrating an example method for one or more server devices to update a radio model according to an implementation.

FIG. 6 is a flow diagram 600 illustrating an example method for one or more server devices to update a radio model according to an implementation. As illustrated, flow diagram 600 may include any of operations 602-606. Although operations 602-606 are shown and described in a particular order, it should be understood that methods may be performed in alternative manners without departing from claimed subject matter, including but not limited to, with a different order or number of operations. Also, at least some operations of flow diagram 600 may be performed so as to be fully or partially overlapping with other operation(s). Additionally, although the description below references particular aspects or features illustrated in certain other figures, methods may be performed with other aspects or features.

For certain example implementations, one or more of operations 602-606 may be performed at least partially by one or more server devices 106 that is or are in communication with one or more mobile devices 102. At operation 602, at least one measurement that corresponds to a position of a first mobile device within an indoor environment may be received at one or more communication interfaces. At operation 604, at least one radio model that is stored in one or more memories may be updated based, at least in part, on the at least one measurement to produce at least one updated radio model, with the at least one radio model and the at least one updated radio model corresponding to the indoor environment. At operation 606, the at least one updated radio model may be transmitted to enable a second mobile device to use the at least one updated radio model for positioning within the indoor environment. Additionally or alternatively, the at least one updated radio model may be transmitted to enable the first mobile device to use the at least one updated radio model for positioning within the indoor environment.

Figure 7:
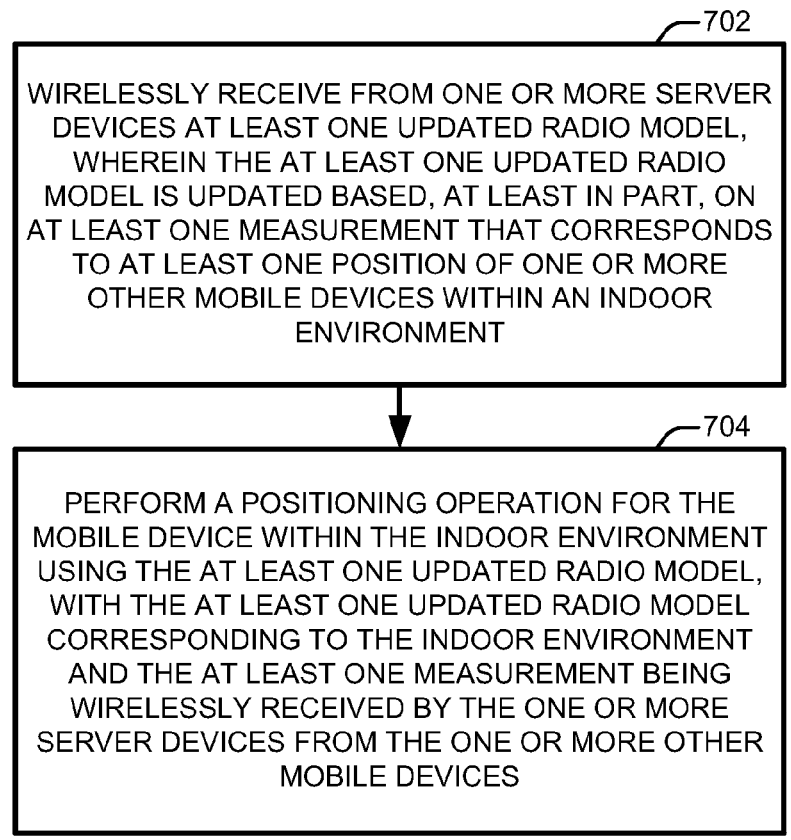
FIG. 7 is a flow diagram illustrating an example method for a mobile device to use an updated radio model according to an implementation.

FIG. 7 is a flow diagram 700 illustrating an example method for a mobile device to use an updated radio model according to an implementation. As illustrated, flow diagram 700 may include any of operations 702-704. Although operations 702-704 are shown and described in a particular order, it should be understood that methods may be performed in alternative manners without departing from claimed subject matter, including but not limited to, with a different order or number of operations. Also, at least some operations of flow diagram 700 may be performed so as to be fully or partially overlapping with other operation(s). Additionally, although the description below references particular aspects or features illustrated in certain other figures, methods may be performed with other aspects or features.

For certain example implementations, one or more of operations 702-704 may be performed at least partially by at least one mobile device 102 that is in communication with one or more server devices 106. At operation 702, at least one updated radio model may be wirelessly received from one or more server devices. The at least one updated radio model may be updated based, at least in part, on at least one measurement that corresponds to at least one position of one or more other mobile devices within an indoor environment. At operation 704, a positioning operation may be performed for the mobile device within the indoor environment using the at least one updated radio model. The at least one updated radio model may correspond to the indoor environment, and the at least one measurement may be wirelessly received by the one or more server devices from the one or more other mobile devices.

Figure 8:
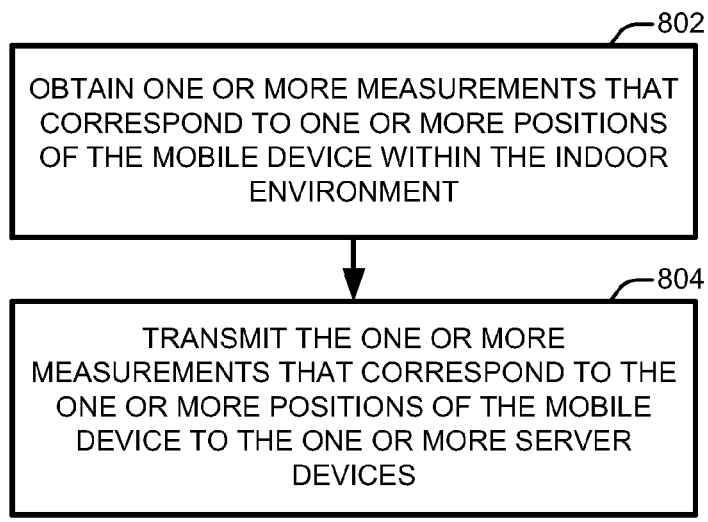
FIG. 8 is a flow diagram illustrating an example method for a mobile device to participate in updating a radio model according to an implementation.

FIG. 8 is a flow diagram 800 illustrating an example method for a mobile device to participate in updating a radio model according to an implementation. As illustrated, flow diagram 800 may include any of operations 802-804. Although operations 802-804 are shown and described in a particular order, it should be understood that methods may be performed in alternative manners without departing from claimed subject matter, including but not limited to, with a different order or number of operations. Also, at least some operations of flow diagram 800 may be performed so as to be fully or partially overlapping with other operation(s). Additionally, although the description below references particular aspects or features illustrated in certain other figures, methods may be performed with other aspects or features.

For certain example implementations, one or more of operations 802-804 may be performed at least partially by at least one mobile device 102 that is in communication with one or more server devices 106. At operation 802, one or more measurements that correspond to one or more positions of the mobile device within the indoor environment may be obtained. At operation 804, the one or more measurements that correspond to the one or more positions of the mobile device may be transmitted to the one or more server devices to be used in an update operation.

In example implementations, a mobile device may obtain multiple measurements that correspond to multiple positions of the mobile device within the indoor environment. The mobile device may batch the multiple measurements into a batch of the multiple measurements. The batch of the multiple measurements may be transmitted wirelessly or via wire to one or more server devices responsive to a determinable occurrence. By way of example but not limitation, a determinable occurrence may comprise a time at which transmission costs are below a given threshold, a time at which transmission rates are above a given threshold, a time while a mobile device is detected to be connected by wire to the Internet, a predetermined time at which a navigational application is scheduled to report measurements and corresponding positions, or any combination thereof, etc.

Figure 9:
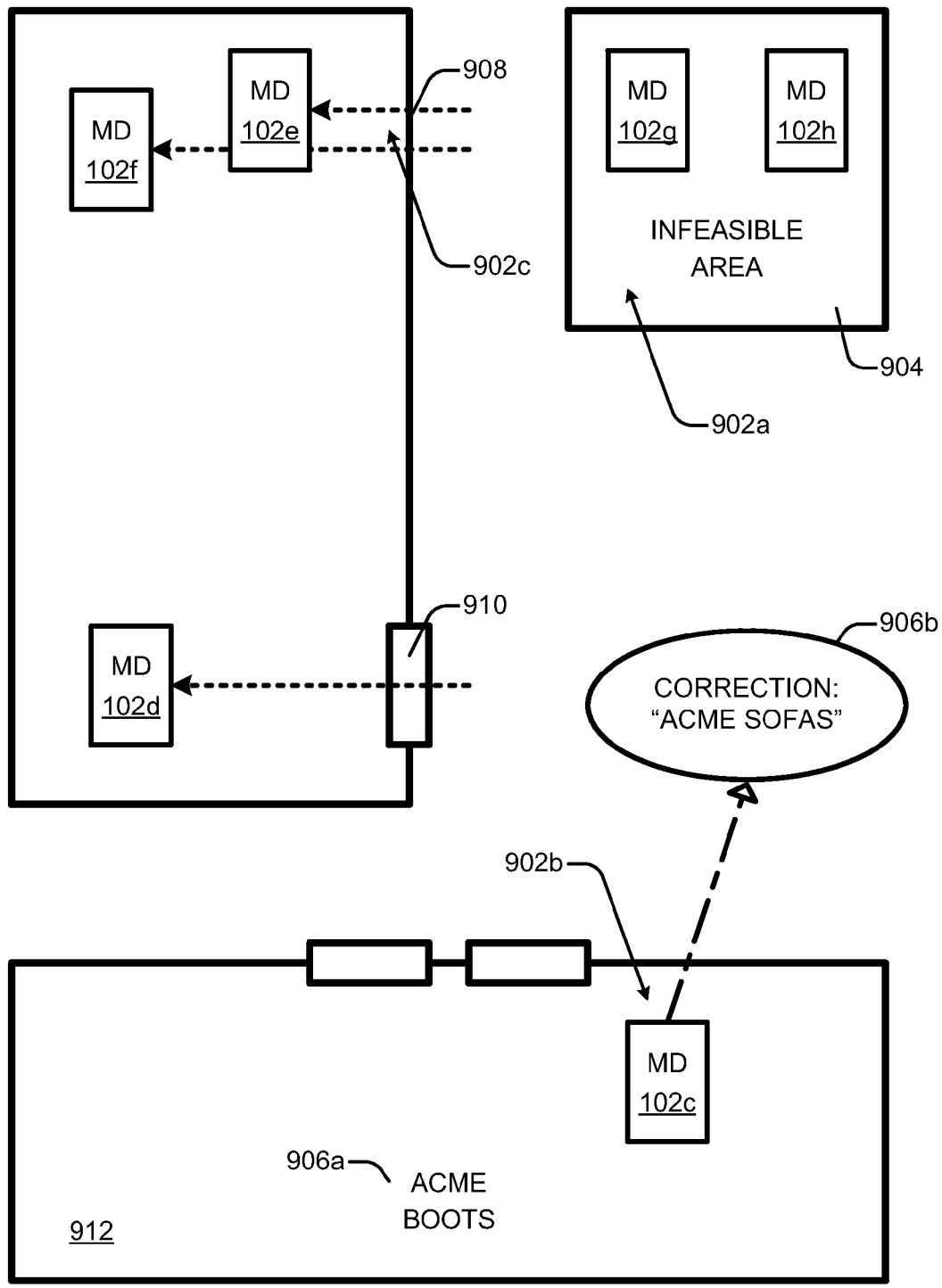
FIG. 9 is a schematic diagram of at least a portion of an indoor environment in which mobile devices may experience examples of incidents that apparently conflict with a graph, and at least one of these incidents may result in a graph updating operation.

FIG. 9 is a schematic diagram 900 of at least a portion of an indoor environment in which mobile devices may experience examples of incidents that apparently conflict with a graph, and at least one of these incidents may result in a graph updating operation. As illustrated, schematic diagram 900 may include one or more of three incidents 902 (e.g., a first incident 902a, a second incident 902b, or a third incident 902c). Schematic diagram 900 may further include multiple mobile devices 102c-102h; an infeasible area 904; annotation information 906 (e.g., POI information), such as incorrect annotation information 906a or corrected annotation information 906b; an apparent obstacle 908; a passageway 910; or an area 912. Each example incident 902 is described below. However, claimed subject matter is not limited to these three example incidents 902 (e.g., first incident 902a, second incident 902b, or third incident 902c).

For certain example implementations, first incident 902a may involve an area that has been labeled an infeasible area 904 or one or more mobile devices 102, such as mobile device 102g or 102h. As shown in FIG. 9, mobile device 102g or mobile device 102h may be located within an area that is identified by annotation information (e.g., POI information) associated with schematic map 402 (e.g., of FIG. 4) as being infeasible, as indicated by infeasible area 904. Additionally or alternatively, a mobile device may detect that it is located in area to which a graph 408 does not extend. This may perhaps occur, for instance, when an area that was previously reserved for a food purveyor in a food court of a mall is removed to make room for additional seating space. Mobile device 102g or mobile device 102h may detect a discrepancy such as an infeasible area label being associated with an area in which they are currently located. A mobile device may detect that it is located within an area that is labeled as an infeasible area 904 by processing annotation information.

Thus, for an incident that apparently conflicts with a graph, there may be one or more indications that at least one mobile device is located within an area (i) that is labeled as an infeasible area by annotation information or (ii) to which a graph 408 does not extend. A mobile device may transmit and a crowdsourcing server device 106c may receive such indications. In response to receiving such indications, crowdsourcing server device 106c may update a graph 408 corresponding to an indoor environment in which the mobile device(s) are located (i) by labeling the area as a feasible area to produce updated annotation information or (ii) by extending a graph 408 into the area to produce an updated graph. Prior to initiating an updating operation, a crowdsourcing server device 106c may institute at least one threshold to ensure that a predetermined number of mobile devices are detected as being located within an infeasible area 904 or to ensure that a predetermined period of time over which such conflicting incidents are detected has elapsed, for example.

For certain example implementations, second incident 902b may involve an area that is associated with incorrect annotation information 906a (e.g., incorrect POI information). For instance, an area 912 may be associated with incorrect annotation information 906a, such as "Acme Boots". This may perhaps occur, for instance, when one store in a mall closes and is replaced by a new store. A user of a mobile device may detect an incorrectly annotated area and report the error. A mobile device 102c may detect that incorrect annotation information 906a that is associated with an area 912 of a schematic map 402 is actually incorrect. Here, such detection by a mobile device may include detecting input from a user indicating that POI information is incorrect.

Thus, for an incident that apparently conflicts with annotation information, there may be one or more indications from at least one mobile device that POI information associated with an area of a map is incorrect. A mobile device may transmit and a crowdsourcing server device 106c or a POI server device 106p may receive such indications. In response to receiving such indications, a crowdsourcing server device 106c or a POI server device 106p may update annotation information corresponding to an indoor environment and pertaining to incorrect POI information by disassociating the incorrect POI information from an identified area in updated POI information (e.g., by replacing incorrect POI information with a "none", "unknown", etc. designation).

Furthermore, a user may be empowered to submit corrected annotation information 906b (e.g., corrected POI information), such as "Acme Sofas". For example, detection by a mobile device may further include detection of corrected POI information being entered by a user. Thus, for an incident that apparently conflicts with annotation information, there may be one or more indications from at least one mobile device that comprise corrected POI information for an area. To facilitate a correction, a mobile device 102c may transmit corrected annotation information 906b for area 912 to at least one crowdsourcing server device 106c or at least one POI server device 106p that is capable of updating annotation information based at least partly on corrected annotation information 906b for area 912. A mobile device may transmit and a crowdsourcing server device 106c or a POI server device 106p may receive such indications that include corrected POI information for an area. In response to receiving such indications, a crowdsourcing server device 106c or a POI server device 106p may update annotation information by associating corrected POI information with an identified area in updated annotation information. A crowdsourcing server device 106c or a POI server device 106p may institute one or more thresholds to ensure that at least one predetermined number of mobile devices detect (or report) incorrect POI information or that at least one predetermined number of mobile devices submit corrected POI information prior to implementing a disassociating or an associating operation, respectively. Additionally or alternatively, a crowdsourcing server device 106c or a POI server device 106p may institute at least one threshold to ensure that a predetermined time period elapses over which incorrect notifications or corrected annotation information is reported prior to implementing a given correction operation.

For certain example implementations, third incident 902c may involve one or more mobile devices 102, such as mobile devices 102e or 102f, or at least one apparent obstacle 908. Mobile devices 102d, 102e, or 102f are associated with tracked trajectories that are represented by dashed arrows. A trajectory may comprise, by way of example but not limitation, (i) at least two positions at which a mobile device has been located, (ii) a distance and direction over which a mobile device has traveled, (iii) or any combination thereof, etc. A tracked trajectory may comprise, by way of example but not limitation, a trajectory that has been observed, recorded, stored, noted, or any combination thereof, etc.

Mobile device 102d is shown by way of its trajectory to have moved through a passageway 910, such as a doorway. Mobile device 102e or mobile device 102f, on the other hand, are shown by way of their respective trajectories as having moved through an apparent obstacle 908. This may perhaps occur, for instance, if a store in a mall has installed a new entrance to increase foot traffic. Mobile device 102e or mobile device 102f may detect such a discrepancy (i) between at least one respective tracked trajectory and one or more traversable paths of a graph 408 or (ii) between at least one respective tracked trajectory and a schematic map 402. More specifically, a mobile device may detect that a tracked trajectory for itself passes through an apparent obstacle 908 that is present in a schematic map 402 or that a tracked trajectory has deviated from traversable paths of a graph 408.

Thus, for an incident that apparently conflicts with a graph, there may be one or more indications that at least one mobile device has passed through an apparent obstacle 908 that is present in a schematic map 402 or that one or more positions have deviated from traversable paths of a graph 408. A mobile device may transmit and a crowdsourcing server device 106c may receive such indications. In response to receiving such indications, a crowdsourcing server device 106c may update a schematic map 402 (e.g., by removing an apparent obstacle, by inserting a passageway where the apparent obstacle was previously located, a combination thereof, etc.) or a graph 408 (e.g., by adding at least one edge extending through where the apparent obstacle was previously located, etc.) corresponding to an indoor environment. For example, an apparent obstacle may be marked as questionable in an updated schematic map, an apparent obstacle may be removed from an updated schematic map, any combination thereof, etc., just to name a couple of examples. Prior to altering an apparent obstacle for an updated schematic map or prior to adding at least one edge extending through a previous apparent obstacle, a crowdsourcing server device 106c may institute at least one threshold to ensure that a predetermined number of conflicting tracked trajectories have been detected or to ensure that a predetermined number of mobile devices have submitted such incident reports. Additionally or alternatively, a crowdsourcing server device 106c may institute at least one threshold to ensure that a predetermined time period elapses over which such incidents are reported prior to implementing a given updating operation to remove an apparent obstacle in a schematic map 402 or to add a traversable path to a graph 408.

If an incident that apparently conflicts with a schematic map 402, a graph 408, or any combination thereof, etc. is reported by a mobile device, such a report may include, by way of example but not limitation, at least one measurement (e.g., that indicates a position of a mobile device), a position of a mobile device, or any combination thereof, etc. For certain example implementations, with reference at least to first incident 902a or third incident 902c, a mobile device 102 may not explicitly report an incident that apparently conflicts with a schematic map 402 or a graph 408. Instead, mobile devices 102 may transmit at least one position, multiple positions that indicate a tracked trajectory, another indication of a tracked trajectory, or any combination thereof, etc. to a crowdsourcing server device 106c. From one or more positions or a tracked trajectory that are received from a mobile device, a crowdsourcing server device 106c may determine that an incident has occurred that apparently conflicts with a schematic map 402, a graph 408, or any combination thereof, etc. A crowdsourcing server device 106c may update a schematic map 402, a graph 408, or any combination thereof, etc. based, at least in part, on one or more positions or a tracked trajectory that is or are received from at least one mobile device and that indicate an incident has occurred that conflicts with a schematic map 402, a graph 408, or any combination thereof, etc.

Figure 10A:
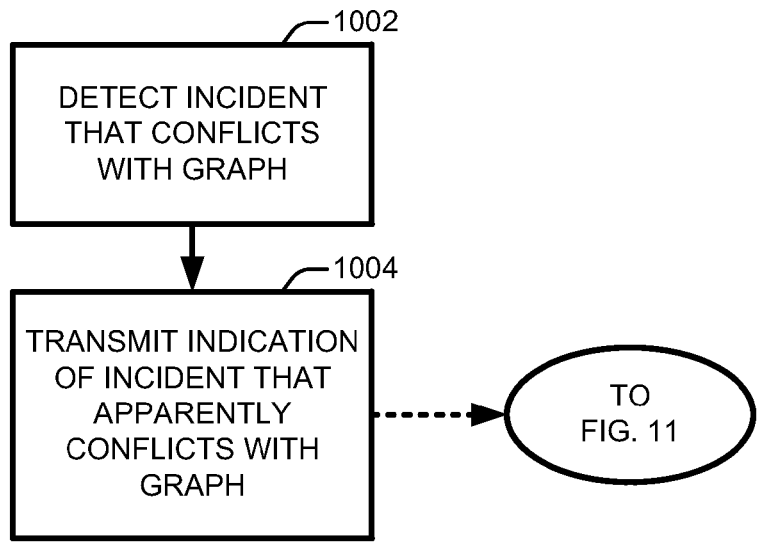
FIG. 10A is a flow diagram illustrating an example method for a mobile device to participate in updating a graph according to an implementation.
Figure 10B:
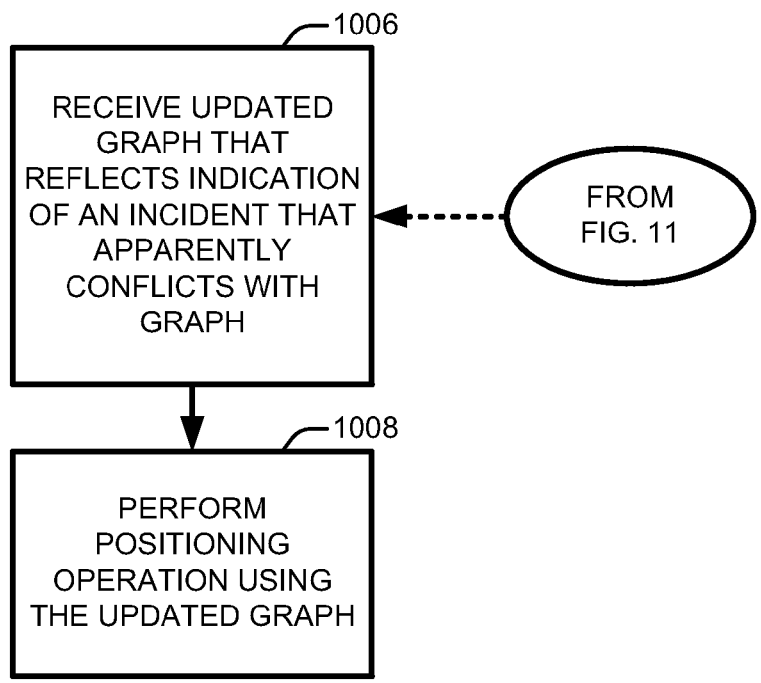
FIG. 10B is a flow diagram illustrating an example method for a mobile device to use an updated graph according to an implementation.

FIG. 10A is a flow diagram 1000A illustrating an example method for a mobile device to participate in updating a graph according to an implementation. FIG. 10B is a flow diagram 1000B illustrating an example method for a mobile device to use an updated graph according to an implementation. As illustrated, flow diagram 1000A may include any of operations 1002-1004, or flow diagram 1000B may include any of operations 1006-1008. Although operations 1002-1004 or 1006-1008 are shown and described in a particular order, it should be understood that methods may be performed in alternative manners without departing from claimed subject matter, including but not limited to, with a different order or number of operations. Also, at least some operations of flow diagram 1000A or 1000B may be performed so as to be fully or partially overlapping with other operation(s). Additionally, although the description below references particular aspects or features illustrated in certain other figures, methods may be performed with other aspects or features.

For certain example implementations, one or more of operations 1002-1004 or 1006-1008 may be performed at least partially by at least one mobile device 102 that is in communication with one or more server devices 106. Operation 1002 or 1004 of flow diagram 1000A may pertain, for example, at least to participating in updating a graph. Operation 1006 or 1008 of flow diagram 1000B may pertain, for example, at least to using an updated graph. A single mobile device or different mobile devices may perform operations 1002-1004 or 1006-1008.

In an example implementation of flow diagram 1000A, at operation 1002, an incident that apparently conflicts with a graph may be detected. For example, a mobile device 102 may be located at one or more positions that deviate from nodes or edges of a graph 408. At operation 1004, an indication of an incident that apparently conflicts with a graph may be transmitted. For example, a mobile device 102 may transmit a report that describes an incident 902 that apparently conflicts with a graph 408 or may transmit measurement(s) or position(s) from which it is determinable that an incident 902 that apparently conflicts with a graph 408 has occurred.

Figure 11:
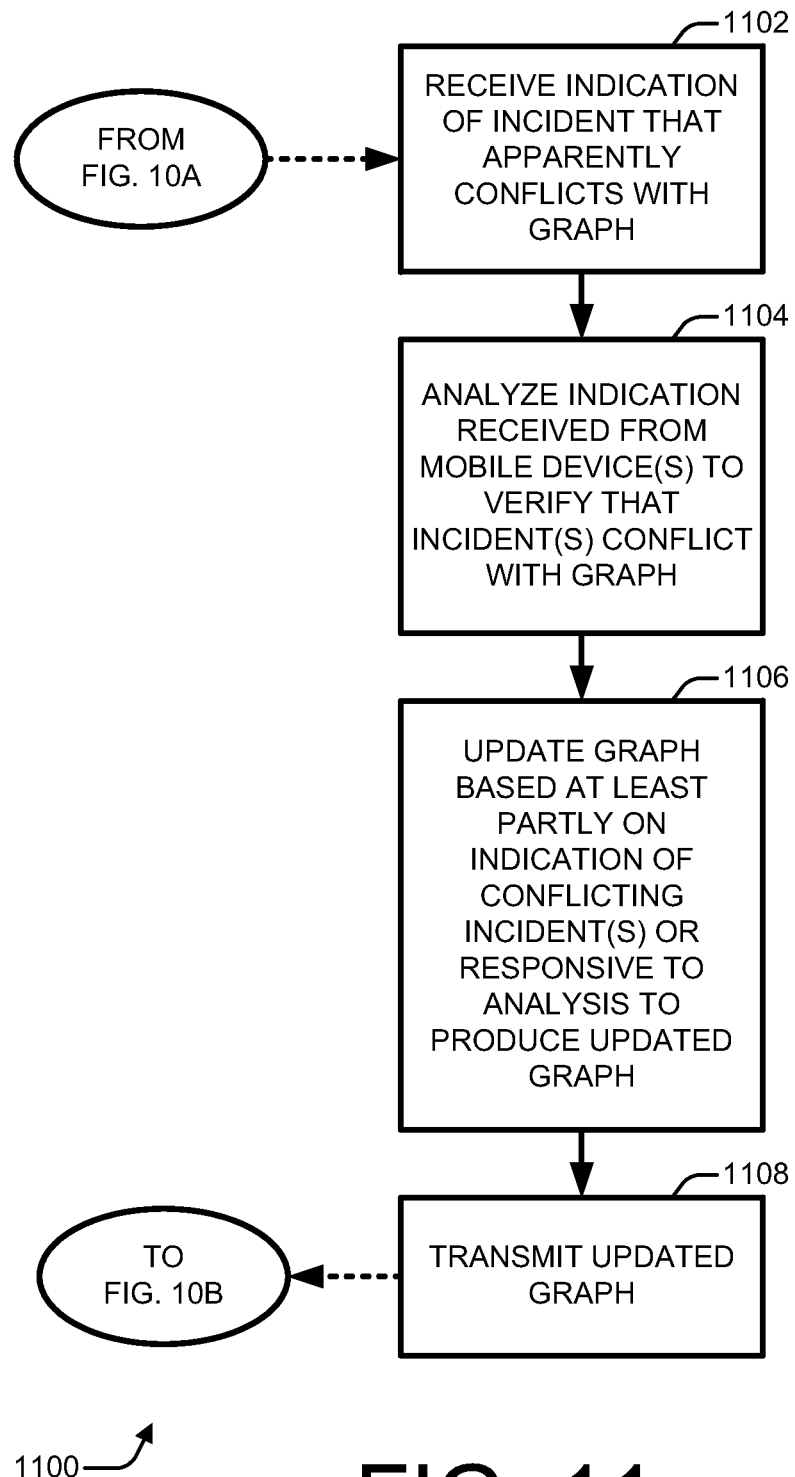
FIG. 11 is a flow diagram illustrating an example method for one or more server devices to update a graph according to an implementation.

After operation 1004, a flow of operations may continue with one or more server devices as shown at FIG. 11 and described herein below. From FIG. 11, operations may continue with flow diagram 1000B. In an example implementation of flow diagram 1000B, at operation 1006, an updated graph that reflects one or more indications of at least one incident that apparently conflicts with a graph may be received. For example, an updated graph that includes at least one additional node or edge indicative of location(s) to which a mobile device may move may be received. At operation 1008, at least one positioning operation may be performed using the updated graph.

FIG. 11 is a flow diagram 1100 illustrating an example method for one or more server devices to update a graph according to an implementation. As illustrated, flow diagram 1100 may include any of operations 1102-1108. Although operations 1102-1108 are shown and described in a particular order, it should be understood that methods may be performed in alternative manners without departing from claimed subject matter, including but not limited to, with a different order or number of operations. Also, at least some operations of flow diagram 1100 may be performed so as to be fully or partially overlapping with other operation(s). Additionally, although the description below references particular aspects or features illustrated in certain other figures, methods may be performed with other aspects or features.

For certain example implementations, one or more of operations 1102-1108 may be performed at least partially by one or more server devices 106 that is or are in communication with one or more mobile devices 102. As described herein above, a flow of operations for flow diagram 1100 may continue from those of FIG. 10A. At operation 1102, one or more indications of at least one incident that apparently conflicts with a graph may be received. For example, a crowdsourcing server device 106c may receive a report that describes an incident 902 that apparently conflicts with a graph 408 or may receive measurement(s) or position(s) from which it is determinable that an incident 902 that apparently conflicts with a graph 408 has occurred.

At operation 1104, one or more indications that are received from one or more mobile devices may be analyzed to verify that at least one incident does conflict with a graph. For example, a crowdsourcing server device 106c may verify that multiple positions or a tracked trajectory of a mobile device of at least one mobile device indicates that a graph 408 does not match a characteristic of the physical world. For instance, position(s) or a tracked trajectory may indicate that a mobile device is or was located at one or more positions that do not correspond to nodes or edges of graph 408 or do not match a traversable path of graph 408. Additionally or alternatively, but by way of example only, a crowdsourcing server device 106c may verify that incidents conflict with graph 408 by ensuring that a predetermined number of mobile devices have transmitted indications that apparently conflict with a graph or that multiple incidents that conflict with a graph 408 have been received over a predetermined period of time.

At operation 1106, a graph may be updated based, at least partly, on one or more indications of at least one incident that conflicts with the graph, or responsive to an analysis thereof, to produce an updated graph. For example, a crowdsourcing server device 106c may update a graph 408 based, at least partly, on one or more indications of at least one incident that apparently conflicts with graph 408 to produce an updated graph. Updating of a graph 408 may further be performed responsive to an analysis verifying that one or more received incidents do actually conflict with graph 408. At operation 1108, an updated graph may be transmitted. For example, a crowdsourcing server device 106c may transmit an updated graph to a mobile device 102 or to map server device 106m. As described herein above, a flow of operations may continue to flow diagram 1000B of FIG. 10B.

Figure 12:
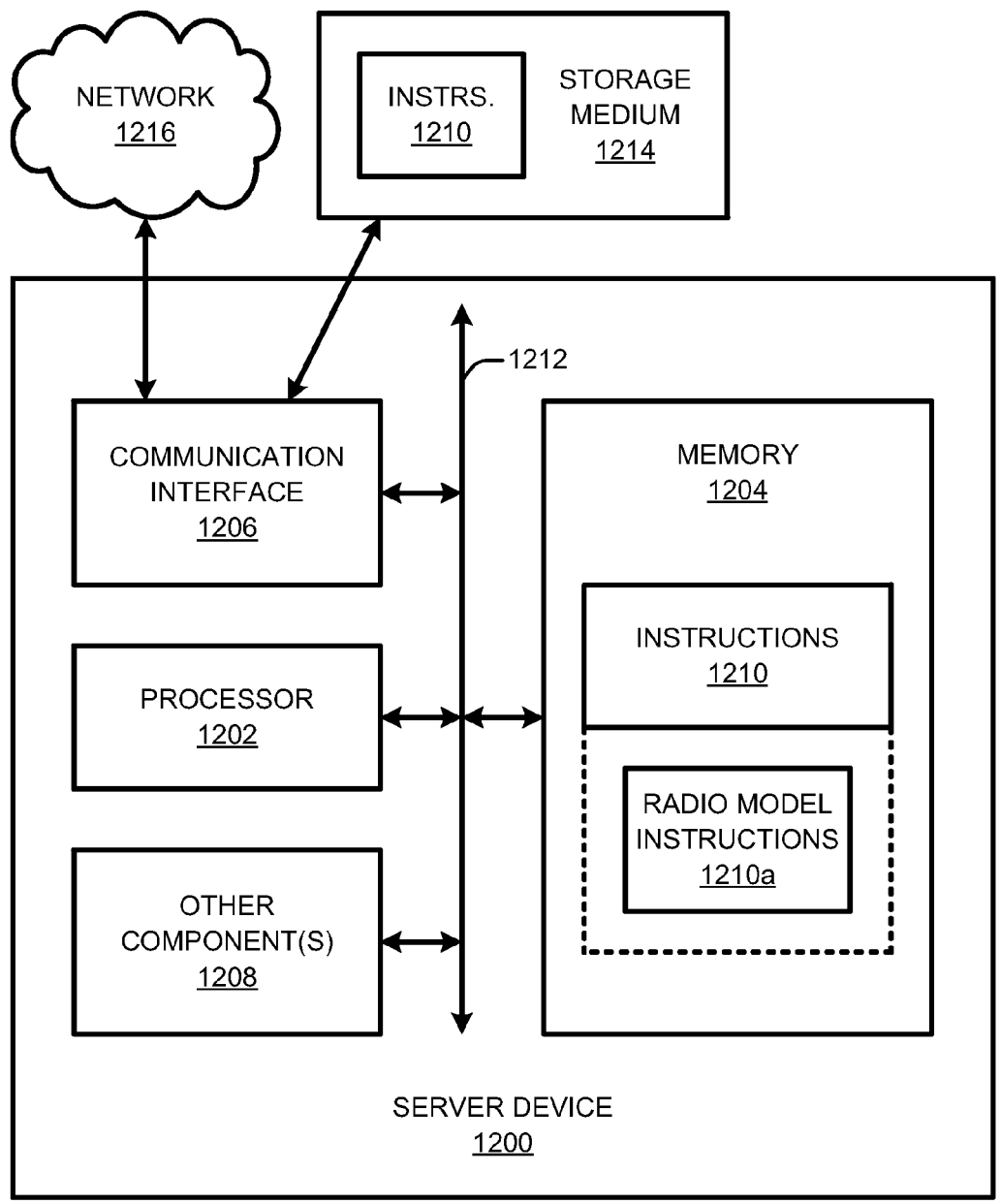
FIG. 12 is a schematic diagram illustrating an example server device, according to an implementation, that may implement one or more aspects of radio model updating in conjunction with an indoor environment.

FIG. 12 is a schematic diagram illustrating an example server device 1200, according to an implementation, that may implement one or more aspects of radio model updating in conjunction with an indoor environment. As illustrated, server device 1200 may include at least one processor 1202, one or more memories 1204, at least one communication interface 1206, one or more other component(s) 1208, or at least one interconnect 1212, etc. FIG. 12 also illustrates at least one storage medium 1214 and one or more networks 1216. A server device 1200 may have access to storage medium 1214 or networks 1216. Memory 1204 or storage medium 1214 may include instructions 1210. However, a server device 1200 may alternatively include or have access to more, fewer, or different components from those that are illustrated without departing from claimed subject matter.

For certain example implementations, a server device 106 (e.g., of FIGS. 1, 3, and 5) may comprise a server device 1200. Server device 1200 may include or comprise at least one electronic device, such as a device with processing capabilities. Server device 1200 may comprise, for example, any electronic device having at least one processor or memory. Examples of server devices 1200 may include, but are not limited to, a desktop computer, one or more server blades, at least one server machine, at least one telecommunications node, an intelligent router or switch, an access point, or any combination thereof, etc.

One or more processors 1202 may comprise one or more separate or integrated processors. A processor 1202 may be programmed with instructions, such as instructions 1210, to become a special purpose processor that implements at least a portion of any procedure(s) that are described herein. Memory 1204 may store, contain, or otherwise provide access to at least a portion of instructions 1210 that may be executable by a processor 1202. Examples for instructions 1210 may include, but are not limited to: a program, or an application, etc. or portion thereof; operational data structures; processor-executable instructions; computer-implemented instructions; code or coding; or any combination thereof; etc. Execution of instructions 1210 by one or more processors 1202 may transform server device 1200 into a special purpose computing device, apparatus, platform, or any combination thereof, etc.

Instructions 1210 may include, by way of example but not limitation, radio model instructions 1210a. In certain example implementations, radio model instructions 1210a may correspond to, for example, instructions that are capable of realizing: at least a portion of one or more implementations of flow diagrams 600 or 1100 (of FIG. 6 or 11), such as any of operations 602-606 or 1102-1108; at least a portion of any interactions shown in FIG. 3 or 5 from a server device perspective; or any combination thereof; etc., just to name a few examples. In an example implementation, a server device 1200 may execute radio model instructions 1210a to update or disseminate a radio model. For example, one or more server devices 106 (e.g., of FIG. 1, 3, or 5) may update at least one radio model 404 (e.g., of FIG. 4 or 5) based, at least in part, on one or more measurements received from at least one mobile device. In another example implementation, one or more server devices 106 (e.g., of FIG. 1, 3, or 5) may update at least one graph 408 (e.g., of FIG. 4) based, at least in part, on one or more incident reports, on at least one measurement, on at least one position, or any combination thereof, etc. that indicate an apparent conflict with a graph and that are received from at least one mobile device. Other alternatives may instead be implemented without departing from claimed subject matter.

At least one communication interface 1206 may provide one or more hardware or software interfaces between server device 1200 and other devices or human operators. Hence, communication interface 1206 may comprise a screen, a speaker, a microphone, a camera, a keyboard or keys, or other human-device input or output features. Additionally or alternatively, a communication interface 1206 may comprise a transceiver (e.g., a transmitter or a receiver), a radio, an antenna, a network interface (e.g., a wired hardware interface connector, such as a network interface card; or a wireless interface connector, such as a Bluetooth® or near field communication (NFC) unit; etc.), a local hardware interface (e.g., a universal serial bus (USB) connector, or a Light Peak® connector, etc.), or any combination thereof, etc. to communicate wireless and/or wired signals (e.g., over wireless or wired communication links) via one or more networks 1216. Communications using at least one communication interface 1206 may enable transmitting, receiving, or initiating of transmissions, etc., just to name a few examples.

One or more networks 1216 may comprise at least one wireless or wired network. Examples of networks 1216 may include, but are not limited to, a local area network (LAN), a wireless LAN (WLAN), a wide area network (WAN), a wireless WAN (WWAN), a cellular network, a telecommunications network, the internet, an ad hoc network, an infrastructure network, or any combination thereof, etc. A storage medium 1214 may store, for example, at least a portion of instructions 1210. A storage medium 1214 may be external (as shown) to server device 1200. If external, storage medium 1214 may be local or remote from server device 1200. An external implementation of a storage medium 1214 may comprise a separate memory device or may comprise part of another electronic device. Although not so explicitly illustrated, storage medium 1214 may also or alternatively be located within, or be internal to, server device 1200. Examples of storage medium 1214 may include, but are not limited to, a hard drive, a disk, a disc, a storage array, volatile memory, nonvolatile memory, a USB drive, a memory card, a computer-readable medium, or any combination thereof, etc.

Server device 1200 may include at least one interconnect 1212 that comprises one or more buses, channels, switching fabrics, or combinations thereof, etc. to enable signal communication between or among components of server device 1200. Other component(s) 1208 may comprise one or more other auxiliary processing, storage, or communication components; power sources; apparatuses providing other feature(s); or any combination thereof; etc. Although not explicitly illustrated in FIG. 12, one or more components of server device 1200 may be coupled to interconnect 1212 via a discrete or integrated interface. By way of example only, an interface may couple processor 1202 or communication interface 1206 to interconnect 1212.

In example implementations, a device, such as server device 1200, may comprise at least one memory 1204 and one or more processors 1202. At least one memory 1204 may store instructions 1210. One or more processors 1202 may be configured to execute instructions 1210, e.g., to perform one or more procedures, processes, operations, or any combination thereof, etc. In example implementations, an article (e.g., an article of manufacture) may comprise at least one storage medium 1214. At least one storage medium 1214 may have stored thereon instructions 1210 that are executable by one or more processors 1202, e.g., to perform one or more procedures, processes, operations, or any combination thereof, etc.

Figure 13:
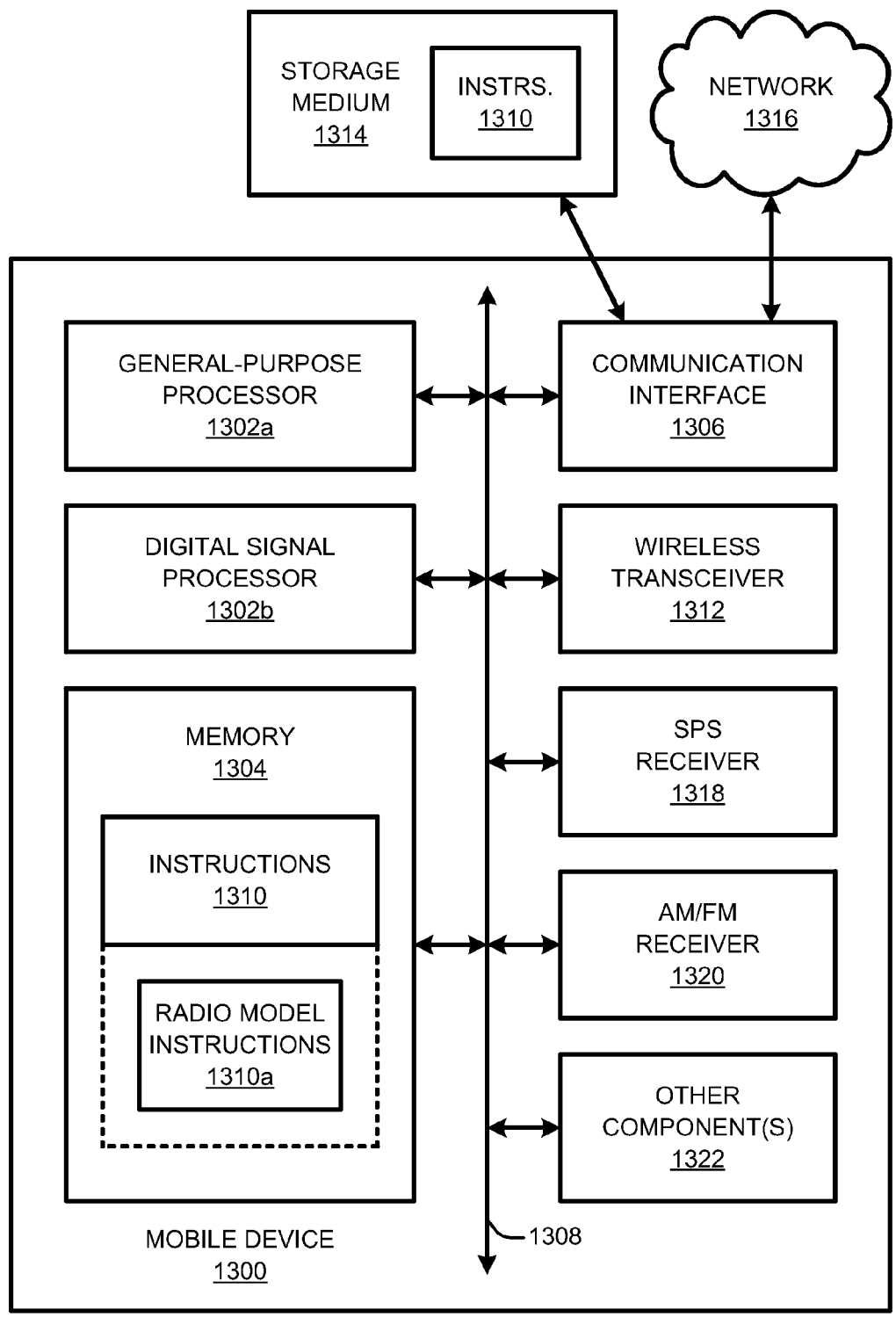
FIG. 13 is a schematic diagram illustrating an example mobile device, according to an implementation, that may implement one or more aspects of radio model updating in conjunction with an indoor environment.

FIG. 13 is a schematic diagram illustrating an example mobile device 1300, according to an implementation, that may implement one or more aspects of radio model updating in conjunction with an indoor environment. As illustrated, mobile device 1300 may include at least one processor 1302 (e.g., a general-purpose processor 1302a or a digital signal 1302b), one or more memories 1304, at least one communication interface 1306, at least one interconnect 1308, at least one wireless transceiver 1312, at least one SPS receiver 1318, at least one AM/FM receiver 1320, or one or more other component(s) 1322, etc. FIG. 13 also illustrates at least one storage medium 1314 and one or more networks 1316. A mobile device 1300 may have access to storage medium 1314 or networks 1316. Memory 1304 or storage medium 1314 may include instructions 1310. However, a mobile device 1300 may alternatively include or have access to more, fewer, or different components from those that are illustrated without departing from claimed subject matter.

For certain example implementations, a mobile device 102 (e.g., of FIGS. 1-3 and 5) may comprise a mobile device 1300. Mobile device 1300 may include or comprise at least one electronic device, such as a device with processing capabilities. Mobile device 1300 may comprise, for example, any electronic device having at least one processor or memory. Examples of mobile devices 1300 may include, but are not limited to, a notebook or laptop computer, a personal digital assistant (PDA), a netbook, a slate or tablet computer, a portable entertainment device, a mobile phone, a smart phone, a mobile terminal (MT), a mobile station (MS), a user equipment (UE), a personal navigation device (PND), or any combination thereof, etc.

One or more processors 1302 may comprise one or more separate or integrated processors. As illustrated, one or more processors 1302 may comprise a general-purpose processor 1302*a*, a digital signal processor 1302*b*, or any combination thereof, etc. General-purpose processor 1302*a* may be programmed with instructions, such as instructions 1310, to become a special purpose processor that implements at least a portion of any procedure(s) that are described herein. A digital signal processor (DSP) 1302*b* may comprise a processor having an architecture that is at least partially enhanced to process digital signals. Digital signal processor 1302*b* may be programmed with instructions, such as instructions 1310, to become a special purpose digital signal processor that implements at least a portion of any procedure(s) that are described herein. General-purpose processor 1302*a* or digital signal processor 1302*b* may operate individually or jointly to implement any procedure(s) that are described herein.

Memory 1304 may store, contain, or otherwise provide access to at least a portion of instructions 1310 that may be executable by a processor 1302. Examples for instructions 1310 may include, but are not limited to: a program, or an application, etc. or portion thereof; operational data structures; processor-executable instructions; computer-implemented instructions; code or coding; or any combination thereof; etc. Execution of instructions 1310 by one or more processors 1302 may transform mobile device 1300 into a special purpose computing device, apparatus, platform, or any combination thereof, etc.

Instructions 1310 may include, by way of example but not limitation, radio model instructions 1310*a*. In certain example implementations, radio model instructions 1310*a* may correspond to, for example, instructions that are capable of realizing: at least a portion of one or more implementations of flow diagrams 800, 1000A, or 1000B (of FIG. 8, 10A, or 10B), such as any of operations 802-808, 1002-1004, or 1006-1008; at least a portion of any interactions shown in FIG. 3 or 6 or 9 from a mobile device perspective; or any combination thereof; etc., just to name a couple of examples. In one particular implementation, a mobile device 102 (e.g., of FIG. 1-3 or 6) may execute radio model instructions 1310*a* to ascertain at least one measurement 502 (e.g., of FIG. 6) corresponding to at least one position 204 (e.g., of FIGS. 2 and 6) and to transmit wirelessly the at least one measurement 502 to one or more server devices (e.g., of FIG. 1, 3, or 6). In another particular implementation, a mobile device 102 may execute radio model instructions 1310*a* to receive wirelessly at least one updated radio model 404U (e.g., of FIG. 6) from one or more server devices 106 and to perform a positioning operation using the at least one updated radio model 404U. In yet other particular implementations, a mobile device 102 may execute radio model instructions 1310*a* to participate in updating a graph 408 (e.g., of FIG. 4) by detecting one or more incidents 902 (e.g., of FIG. 9) or to use an updated graph. Other alternatives may instead be implemented without departing from claimed subject matter.

At least one communication interface 1306 may provide one or more hardware or software interfaces between mobile device 1300 and other devices or human operators. Hence, communication interface 1306 may comprise a screen, a speaker, a microphone, a camera, a keyboard or keys, or other human-device input or output features. Additionally or alternatively, a communication interface 1306 may comprise a transceiver (e.g., a transmitter or a receiver), a radio, an antenna, a network interface (e.g., a wired hardware interface connector, such as a network interface card; or a wireless interface connector, such as a Bluetooth® or near field communication (NFC) unit; etc.), a local hardware interface (e.g., a universal serial bus (USB) connector, or a Light Peak® connector, etc.), or any combination thereof, etc. to communicate wireless and/or wired signals (e.g., over wireless or wired communication links) via one or more networks 1316. Communications using at least one communication interface 1306 may enable transmitting, receiving, or initiating of transmissions, etc., just to name a few examples.

One or more networks 1316 may comprise at least one wireless or wired network. Examples of networks 1316 may include, but are not limited to, a local area network (LAN), a wireless LAN (WLAN), a wide area network (WAN), a wireless WAN (WWAN), a cellular network, a telecommunications network, the internet, an ad hoc network, an infrastructure network, or any combination thereof, etc. A storage medium 1314 may store, for example, at least a portion of instructions 1310. A storage medium 1314 may be external (as shown) to mobile device 1300. If external, storage medium 1314 may be local or remote from mobile device 1300. An external implementation of a storage medium 1314 may comprise a separate memory device or may comprise part of another electronic device. Although not so explicitly illustrated, storage medium 1314 may also or alternatively be located within, or be internal to, mobile device 1300. Examples of storage medium 1314 may include, but are not limited to, a hard drive, a disk, a disc, a storage array, volatile memory, nonvolatile memory, a USB drive, a memory card, a computer-readable medium, or any combination thereof, etc.

Additionally or alternatively to communication interface 1306, mobile device 1300 may include one or more transmitters, receivers, transceivers, or any combination thereof, etc. By way of example only, a mobile device may include at least one wireless transceiver 1312, at least one SPS receiver 1318, at least one AM/FM receiver 1320, or any combination thereof, etc. A wireless transceiver 1312 may transmit or receive wireless signals in accordance with, e.g., at least one selected protocol. Example protocols may include, but are not limited to, a cellular or WWAN protocol, a Wi-Fi protocol, a Bluetooth® protocol, or any combination thereof, etc. Wireless transceiver 1312 may communicate, for example, with network 1316 via wireless signals. An SPS receiver 1318 may at least receive SPS signals from one or more satellites, pseudolites, positioning beacons, or any combination thereof, etc. An AM/FM receiver 1320 may at least receive amplitude modulated (AM) or frequency modulated (FM) signals. Although not explicitly shown in FIG. 13, wireless transceiver 1312, SPS receiver 1318, AM/FM receiver 1320, or any combination thereof, etc. may be coupled to one or more individual antennas or shared antennas.

Mobile device 1300 may include at least one interconnect 1308 that comprises one or more buses, channels, switching fabrics, or combinations thereof, etc. to enable signal communication between or among components of mobile device 1300. Other component(s) 1322 may comprise one or more other miscellaneous sensors, power sources, apparatuses providing other feature(s), or any combination thereof, etc. In an example implementation, sensors may include, but are not limited to, a thermometer, a barometer, an accelerometer, a compass, a gyroscope, or any combination thereof, etc. Although not explicitly illustrated in FIG. 13, one or more components of mobile device 1300 may be coupled to interconnect 1308 via a discrete or integrated interface. By way of example only, an interface may couple wireless transceiver 1312 or general-purpose processor 1302a to interconnect 1308.

In example implementations, a device, such as mobile device 1300, may comprise at least one memory 1304 and one or more processors 1302. At least one memory 1304 may store instructions 1310. One or more processors 1302 may be configured to execute instructions 1310, e.g., to perform one or more procedures, processes, operations, or any combination thereof, etc. In example implementations, an article (e.g., an article of manufacture) may comprise at least one storage medium 1314. At least one storage medium 1314 may have stored thereon instructions 1310 that are executable by one or more processors 1302, e.g., to perform one or more procedures, processes, operations, or any combination thereof, etc.

Methodologies described herein may be implemented by various means depending upon applications according to particular features or examples. For example, such methodologies may be implemented in hardware, firmware, software, discrete/fixed logic circuitry, or any combination thereof, etc. In a hardware or logic circuitry implementation, for example, a processor or processing unit may be implemented within one or more application specific integrated circuits (ASICs), digital signal processors (DSPs), digital signal processing devices (DSPDs), programmable logic devices (PLDs), field programmable gate arrays (FPGAs), processors generally, controllers, micro-controllers, microprocessors, electronic devices, other devices or units programmed to execute instructions or designed to perform functions described herein, or combinations thereof, just to name a few examples. Herein, the term "control logic" may encompass logic implemented by software, hardware, firmware, discrete/fixed logic circuitry, or any combination thereof, etc.

For a firmware or software implementation, methodologies may be implemented with modules (e.g., procedures, functions, etc.) having instructions that perform functions as described herein. Any machine readable medium tangibly embodying instructions may be used in implementing methodologies as described herein. For example, software coding may be stored in a memory or executed by a processor. Memory may be implemented within a processor or external to a processor. As used herein the term "memory" may refer to any type of long term, short term, volatile, nonvolatile, or other storage memory/medium and is not to be limited to any particular type of memory or number of memories, or type of media upon which memory is stored.

In one or more example implementations, functions described herein may be implemented in hardware, software, firmware, discrete/fixed logic circuitry, any combination thereof, etc. If implemented in firmware or software, functions may be stored on a physical computer-readable (e.g., via electrical digital signals) medium as one or more instructions or code (e.g., realized as at least one article of manufacture comprising at least one storage medium having instructions stored thereon). Computer-readable media may include physical computer storage media that may be encoded with a data structure, a computer program, or any combination thereof, etc. A storage medium may be any available physical medium that can be accessed by a computer. By way of example, and not limitation, such computer-readable media may comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, may include compact disc (CD), laser disc, optical disc, digital versatile disc (DVD), floppy disk and blu-ray disc, where disks usually reproduce data magnetically, and discs usually reproduce data optically with lasers.

Also, computer instructions, code, or data, etc. may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, or microwave. Combinations of the above may also be included within the scope of physical transmission media. Such computer instructions or data may be transmitted in portions (e.g., first and second portions) at different times (e.g., at first and second times).

Electronic devices may also operate in conjunction with Wi-Fi/WLAN or other wireless networks. For example, positioning data may be acquired via a Wi-Fi or other wireless network. In addition to Wi-Fi/WLAN signals, a wireless/mobile device may also receive signals from satellites, which may be from a Global Positioning System (GPS), Galileo, GLONASS, NAVSTAR, QZSS, a system that uses satellites from a combination of these systems, or any SPS developed in the future, each referred to generally herein as a Satellite Positioning System (SPS) or GNSS (Global Navigation Satellite System). Furthermore, implementations described herein may be used with positioning determination systems that utilize pseudolites or a combination of satellites and pseudolites. Pseudolites may comprise ground-based transmitters that broadcast a Pseudo-Random Noise (PRN) code or other ranging code (e.g., similar to a GPS or CDMA cellular signal) that is modulated on an L-band (or other frequency) carrier signal, which may be synchronized with GPS time. Each such transmitter may be assigned a unique PN code so as to permit identification by a remote receiver. Pseudolites may be particularly useful in situations where SPS signals from an orbiting satellite might be unavailable, such as in tunnels, mines, buildings, urban canyons, or other enclosed areas. Another implementation of pseudolites is known as radio-beacons. The term "satellite", as used herein, may include pseudolites, equivalents of pseudolites, and similar or analogous technologies. The term "SPS signals", as used herein, may include SPS-like signals from pseudolites or equivalents of pseudolites. Certain implementations may also be applied to femtocells or a combination of systems that includes femtocells. For example, femtocells may provide data or voice communication. Moreover, femtocells may provide positioning data.

Hence, example implementations that are described herein may be used with various SPSs. An SPS typically includes a system of transmitters positioned to enable entities to determine their location on or above the Earth based, at least in part, on signals received from the transmitters. Such a transmitter typically, but not necessarily, transmits a signal marked with a repeating pseudo-random noise (PN) code of a set number of chips and may be located on ground based control stations, user equipment, or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), or the like. Thus, as used herein, an SPS may include any combination of one or more global and/or regional navigation satellite systems or augmentation systems, and SPS signals may include SPS, SPS-like, or other signals associated with one or more SPS.

Network or networks may operate in accordance with any one or more of many different systems, standards, or protocols, etc., just to name a few examples. For example, for an implementation including at least one wireless communication network, such wireless communication network(s) may comprise one or more of a wireless wide area network (WWAN), a wireless local area network (WLAN), a wireless personal area network (WPAN), any combination thereof, and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination thereof, and so on. A CDMA network may implement one or more radio access technologies (RATs) such as cdma2000, Wideband-CDMA (W-CDMA), Time Division Synchronous Code Division Multiple Access (TD-SCDMA), or any combination thereof, etc., just to name a few radio technology examples. Here, cdma2000 may include technologies implemented according to IS-95 standards, IS-2000 standards, IS-856 standards, or any combination thereof, etc. A TDMA network may implement Global System for Mobile Communications (GSM), Digital Advanced Mobile Phone System (D-AMPS), or some other RAT or RATs. GSM and W-CDMA examples are described in documents from a consortium named "3rd Generation Partnership Project" (3GPP). Cdma2000 examples are described in documents from a consortium named "3rd Generation Partnership Project 2" (3GPP2). 3GPP and 3GPP2 documents are publicly available. A WLAN may include an IEEE 802.11x network, and a WPAN may include a Bluetooth network or an IEEE 802.15x network, just to name a few examples. Wireless communication networks may include so-called next generation technologies (e.g., "4G"), such as, for example, Long Term Evolution (LTE), Advanced LTE, WiMAX, Ultra Mobile Broadband (UMB), or any combination thereof, or the like.

Some portions of this Detailed Description are presented in terms of algorithms or symbolic representations of operations on binary digital signals that may be stored within a memory of a specific apparatus or special purpose computing device or platform. In the context of this particular Specification, the term specific apparatus or the like includes a general purpose computer once it is programmed to perform particular functions pursuant to instructions from program software or instructions. Algorithmic descriptions or symbolic representations are examples of techniques used by those of ordinary skill in the signal processing or related arts to convey the substance of their work to others skilled in the art. An algorithm here, and generally, may be considered to be a self-consistent sequence of operations or similar signal processing leading to a desired result. In this context, operations or processing may involve physical manipulation of physical quantities. Typically, although not necessarily, such quantities may take the form of electrical or magnetic signals capable of being stored, transferred, combined, compared, transmitted, received, or otherwise manipulated.

It has proven convenient at times, principally for reasons of common usage, to refer to such signals as bits, data, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "obtaining," "transmitting," "receiving," "performing," "applying," "positioning/locating," "storing," "updating," "providing," "disseminating," "modifying," "making", "taking" or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Likewise, the terms, "and" and "or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic, etc. in the singular or may be used to describe some combination of features, structures, or characteristics, etc. However, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concepts described herein. Therefore, it is intended that claimed subject matter not be limited to the particular examples disclosed, but that such claimed subject matter may also include all aspects falling within the scope of appended claims, and equivalents thereof.

What is claimed is:

1. A method for one or more server devices, the method comprising:
   receiving via one or more communication interfaces at least one measurement that corresponds to a position of a first mobile device within an indoor environment;
   identifying a conflict between the position of the first mobile device and at least one radio model associated with the indoor environment wherein the identifying comprises comparing the at least one measurement with the radio model to identify the conflict;

updating the at least one radio model that is stored in one or more memories based, at least in part, on the at least one measurement to produce at least one updated radio model, the at least one radio model and the at least one updated radio model corresponding to the indoor environment, the updating being responsive to the conflict being identified a threshold number of times based on information received from a plurality of mobile devices providing indications of the positions of the mobile devices within the indoor environment; and transmitting the at least one updated radio model to enable a second mobile device to use the at least one updated radio model for positioning within the indoor environment; receive from the first mobile device at least one indication of an incident that apparently conflicts with at least one graph that corresponds to the indoor environment; update the at least one graph based, at least in part, on the at least one indication of the incident that apparently conflicts with the at least one graph to produce at least one updated graph; and transmit the at least one updated graph to enable the second mobile device to use the at least one updated graph for positioning within the indoor environment.

2. The method of claim 1, wherein said receiving further comprises:
receiving the at least one measurement that corresponds to the position of the first mobile device via at least one wireless transmission sent by the first mobile device.

3. The method of claim 1, wherein the one or more server devices comprise at least one crowdsourcing server device; wherein said receiving, said updating, and said transmitting are performed at least partially by the at least one crowdsourcing server device; and wherein said transmitting further comprises:
transmitting the at least one updated radio model from the at least one crowdsourcing server device to the second mobile device via at least one wireless transmission to enable the second mobile device to use the at least one updated radio model for positioning within the indoor environment.

4. The method of claim 1, wherein the one or more server devices comprise at least one crowdsourcing server device and at least one map server device; wherein said receiving, said updating, and said transmitting are performed at least partially by the at least one crowdsourcing server device; and wherein said transmitting further comprises:
transmitting the at least one updated radio model from the at least one crowdsourcing server device to the at least one map server device.

5. The method of claim 4, wherein said transmitting further comprises:
transmitting, by the at least one map server device, the at least one updated radio model from the at least one map server device to the second mobile device via at least one wireless transmission to enable the second mobile device to use the at least one updated radio model for positioning within the indoor environment.

6. The method of claim 1, wherein said updating further comprises:
updating the at least one radio model to produce the at least one updated radio model based, at least in part, on a reliability of the first mobile device.

7. The method of claim 1, wherein said updating further comprises:
updating the at least one radio model to produce the at least one updated radio model conditioned, at least in part, on one or more situational characteristics.

8. The method of claim 1, wherein:
said receiving further comprises receiving multiple measurements that correspond to multiple mobile devices; and
said updating further comprises:
filtering the multiple measurements to produce at least one filtered measurement; and
updating the at least one radio model to produce the at least one updated radio model based, at least in part, on the at least one filtered measurement.

9. The method of claim 1, further comprising:
receiving from the first mobile device via the one or more communication interfaces at least one indication of an incident that apparently conflicts with at least one graph that corresponds to the indoor environment;
updating the at least one graph based, at least in part, on the at least one indication of the incident that apparently conflicts with the at least one graph to produce at least one updated graph; and
transmitting the at least one updated graph to enable the second mobile device to use the at least one updated graph for positioning within the indoor environment.

10. The method of claim 1, wherein said updating further comprises:
updating one or more values, which are indicative of one or more received signal strength indications, that are included in the at least one updated radio model based, at least in part, on the at least one measurement that corresponds to the position of the first mobile device within the indoor environment, wherein the one or more received signal strength indications represent signals emanating from one or more wireless transmitter devices of the indoor environment.

11. The method of claim 1, wherein said updating further comprises:
updating one or more values, which are indicative of one or more round trip times, that are included in the at least one updated radio model based, at least in part, on the at least one measurement that corresponds to the position of the first mobile device within the indoor environment, wherein the one or more round trip times are associated with one or more communication exchanges between one or more mobile devices and one or more wireless transmitter devices of the indoor environment.

12. The method of claim 1, further comprising:
updating at least one probability map by updating likely positions of mobile devices within the indoor environment based, at least in part, on the position of the first mobile device within the indoor environment to produce at least one updated probability map; and
transmitting the at least one updated probability map to enable the second mobile device to use the at least one updated probability map for positioning within the indoor environment.

13. The method of claim 1, further comprising:
updating at least one connectivity or routing graph based, at least in part, on the position of the first mobile device within the indoor environment to produce at least one updated connectivity or routing graph; and
transmitting the at least one updated connectivity or routing graph to enable the second mobile device to use the at least one updated connectivity or routing graph for positioning within the indoor environment.

14. A special purpose computing apparatus for updating a radio model, the special purpose computing apparatus comprising:
at least one memory to store instructions; and
one or more processors to execute said instructions to:
receive at least one measurement that corresponds to a position of a first mobile device within an indoor environment;
identify a conflict between the position of the first mobile device and at least one radio model associated with the indoor environment wherein the identifying comprises comparing the at least one measurement with the radio model to identify the conflict;
update the at least one radio model based, at least in part, on the at least one measurement to produce at least one updated radio model, the at least one radio model and the at least one updated radio model corresponding to the indoor environment, the update being responsive to the conflict being identified a threshold number of times based on information received from a plurality of mobile devices providing indications of the positions of the mobile devices within the indoor environment; and
transmit the at least one updated radio model to enable a second mobile device to use the at least one updated radio model for positioning within the indoor environment; receive from the first mobile device at least one indication of an incident that apparently conflicts with at least one graph that corresponds to the indoor environment; update the at least one graph based, at least in part, on the at least one indication of the incident that apparently conflicts with the at least one graph to produce at least one updated graph; and transmit the at least one updated graph to enable the second mobile device to use the at least one updated graph for positioning within the indoor environment.

15. The special purpose computing apparatus of claim 14, wherein to receive the at least one measurement said one or more processors are further to execute said instructions to:
receive the at least one measurement that corresponds to the position of the first mobile device via at least one wireless transmission sent by the first mobile device.

16. The special purpose computing apparatus of claim 14, wherein the special purpose computing apparatus comprises at least one crowdsourcing server device; and wherein to transmit the at least one updated radio model said one or more processors are further to execute said instructions to:
transmit the at least one updated radio model from the at least one crowdsourcing server device to the second mobile device via at least one wireless transmission to enable the second mobile device to use the at least one updated radio model for positioning within the indoor environment.

17. The special purpose computing apparatus of claim 14, wherein the special purpose computing apparatus comprises at least one crowdsourcing server device and at least one map server device; and wherein to transmit the at least one updated radio model said one or more processors are further to execute said instructions to:
transmit the at least one updated radio model from the at least one crowdsourcing server device to the at least one map server device.

18. The special purpose computing apparatus of claim 17, wherein to transmit the at least one updated radio model said one or more processors are further to execute said instructions to:
transmit the at least one updated radio model from the at least one map server device to the second mobile device via at least one wireless transmission to enable the second mobile device to use the at least one updated radio model for positioning within the indoor environment.

19. The special purpose computing apparatus of claim 14, wherein to update the at least one radio model said one or more processors are further to execute said instructions to:
update the at least one radio model to produce the at least one updated radio model based, at least in part, on a reliability of the first mobile device.

20. The special purpose computing apparatus of claim 14, wherein to update the at least one radio model said one or more processors are further to execute said instructions to:
update the at least one radio model to produce the at least one updated radio model conditioned, at least in part, on one or more situational characteristics.

21. The special purpose computing apparatus of claim 14, wherein:
to receive the at least one measurement said one or more processors are further to execute said instructions to receive multiple measurements that correspond to multiple mobile devices; and
wherein to update the at least one radio model said one or more processors are further to execute said instructions to:
filter the multiple measurements to produce at least one filtered measurement; and
update the at least one radio model to produce the at least one updated radio model based, at least in part, on the at least one filtered measurement.

22. The special purpose computing apparatus of claim 14, wherein to update the at least one radio model said one or more processors are further to execute said instructions to:
update one or more values, which are indicative of one or more received signal strength indications, that are included in the at least one updated radio model based, at least in part, on the at least one measurement that corresponds to the position of the first mobile device within the indoor environment, wherein the one or more received signal strength indications represent signals emanating from one or more wireless transmitter devices of the indoor environment.

23. The special purpose computing apparatus of claim 14, wherein to update the at least one radio model said one or more processors are further to execute said instructions to:
update one or more values, which are indicative of one or more round trip times, that are included in the at least one updated radio model based, at least in part, on the at least one measurement that corresponds to the position of the first mobile device within the indoor environment, wherein the one or more round trip times are associated with one or more communication exchanges between one or more mobile devices and one or more wireless transmitter devices of the indoor environment.

24. The special purpose computing apparatus of claim 14, wherein said one or more processors are further to execute said instructions to:
update at least one probability map by updating likely positions of mobile devices within the indoor environment based, at least in part, on the position of the first mobile device within the indoor environment to produce at least one updated probability map; and transmit the at least one updated probability map to enable the second mobile device to use the at least one updated probability map for positioning within the indoor environment.

25. The special purpose computing apparatus of claim 14, wherein said one or more processors are further to execute said instructions to:
update at least one connectivity or routing graph based, at least in part, on the position of the first mobile device within the indoor environment to produce at least one updated connectivity or routing graph; and
transmit the at least one updated connectivity or routing graph to enable the second mobile device to use the at least one updated connectivity or routing graph for positioning within the indoor environment.

26. A special purpose computing apparatus for updating a radio model, the special purpose computing apparatus comprising:
means for receiving at least one measurement that corresponds to a position of a first mobile device within an indoor environment;
means for identifying a conflict between the position of the first mobile device and at least one radio model associated with the indoor environment wherein the identifying comprises comparing the at least one measurement with the radio model to identify the conflict;
means for updating the at least one radio model based, at least in part, on the at least one measurement to produce at least one updated radio model, the at least one radio model and the at least one updated radio model corresponding to the indoor environment, the means for updating comprising means for updating the at least one radio model responsive to the conflict being identified a threshold number of times based on information received from a plurality of mobile devices providing indications of the positions of the mobile devices within the indoor environment; and
means for transmitting the at least one updated radio model to enable a second mobile device to use the at least one updated radio model for positioning within the indoor environment; means for receiving from the first mobile device at least one indication of an incident that apparently conflicts with at least one graph that corresponds to the indoor environment; means for updating the at least one graph based, at least in part, on the at least one indication of the incident that apparently conflicts with the at least one graph to produce at least one updated graph; and means for transmitting the at least one updated graph to enable the second mobile device to use the at least one updated graph for positioning within the indoor environment.

27. The special purpose computing apparatus of claim 26, wherein said means for receiving comprises:
means for receiving the at least one measurement that corresponds to the position of the first mobile device via at least one wireless transmission sent by the first mobile device.

28. The special purpose computing apparatus of claim 26, wherein the special purpose computing apparatus comprises at least one crowdsourcing server; and wherein said means for transmitting comprises:
means for transmitting the at least one updated radio model from the at least one crowdsourcing server to the second mobile device via at least one wireless transmission to enable the second mobile device to use the at least one updated radio model for positioning within the indoor environment.

29. The special purpose computing apparatus of claim 26, wherein the special purpose computing apparatus comprises at least one crowdsourcing server and at least one map server; and wherein said means for transmitting comprises:
means for transmitting the at least one updated radio model from the at least one crowdsourcing server to the at least one map server.

30. The special purpose computing apparatus of claim 29, wherein said means for transmitting comprises:
means for transmitting, by the at least one map server, the at least one updated radio model from the at least one map server to the second mobile device via at least one wireless transmission to enable the second mobile device to use the at least one updated radio model for positioning within the indoor environment.

31. The special purpose computing apparatus of claim 26, wherein said means for updating comprises:
means for updating the at least one radio model to produce the at least one updated radio model based, at least in part, on a reliability of the first mobile device.

32. The special purpose computing apparatus of claim 26, wherein said means for updating comprises:
means for updating the at least one radio model to produce the at least one updated radio model conditioned, at least in part, on one or more situational characteristics.

33. The special purpose computing apparatus of claim 26, wherein:
said means for receiving comprises means for receiving multiple measurements that correspond to multiple mobile devices; and
said means for updating comprises:
means for filtering the multiple measurements to produce at least one filtered measurement; and
means for updating the at least one radio model to produce the at least one updated radio model based, at least in part, on the at least one filtered measurement.

34. The special purpose computing apparatus of claim 26, wherein said means for updating comprises:
means for updating one or more values, which are indicative of one or more received signal strength indications, that are included in the at least one updated radio model based, at least in part, on the at least one measurement that corresponds to the position of the first mobile device within the indoor environment, wherein the one or more received signal strength indications represent signals emanating from one or more wireless transmitter devices of the indoor environment.

35. The special purpose computing apparatus of claim 26, wherein said means for updating comprises:
means for updating one or more values, which are indicative of one or more round trip times, that are included in the at least one updated radio model based, at least in part, on the at least one measurement that corresponds to the position of the first mobile device within the indoor environment, wherein the one or more round trip times are associated with one or more communication exchanges between one or more mobile devices and one or more wireless transmitter devices of the indoor environment.

36. The special purpose computing apparatus of claim 26, further comprising:
means for updating at least one probability map by updating likely positions of mobile devices within the indoor environment based, at least in part, on the position of the first mobile device within the indoor environment to produce at least one updated probability map; and means for transmitting the at least one updated probability map to enable the second mobile device to use the at least one updated probability map for positioning within the indoor environment.

37. The special purpose computing apparatus of claim 26, further comprising:
means for updating at least one connectivity or routing graph based, at least in part, on the position of the first mobile device within the indoor environment to produce at least one updated connectivity or routing graph; and
means for transmitting the at least one updated connectivity or routing graph to enable the second mobile device to use the at least one updated connectivity or routing graph for positioning within the indoor environment.

38. An article comprising: at least one non-transitory storage medium having stored thereon instructions executable by one or more processors to:
receive via one or more communication interfaces at least one measurement that corresponds to a position of a first mobile device within an indoor environment;
identify a conflict between the position of the first mobile device and at least one radio model associated with the indoor environment wherein the identifying comprises comparing the at least one measurement with the radio model to identify the conflict;
update the at least one radio model based, at least in part, on the at least one measurement to produce at least one updated radio model, the at least one radio model and the at least one updated radio model corresponding to the indoor environment, the update being responsive to the conflict being identified a threshold number of times based on information received from a plurality of mobile devices providing indications of the positions of the mobile devices within the indoor environment; and
transmit the at least one updated radio model to enable a second mobile device to use the at least one updated radio model for positioning within the indoor environment; receive from the first mobile device at least one indication of an incident that apparently conflicts with at least one graph that corresponds to the indoor environment; update the at least one graph based, at least in part, on the at least one indication of the incident that apparently conflicts with the at least one graph to produce at least one updated graph; and transmit the at least one updated graph to enable the second mobile device to use the at least one updated graph for positioning within the indoor environment.

39. The article of claim 38, wherein to receive the at least one measurement said instructions stored on said at least one storage medium are further executable by the one or more processors to:
receive the at least one measurement that corresponds to the position of the first mobile device via at least one wireless transmission sent by the first mobile device.

40. The article of claim 38, wherein to transmit the at least one updated radio model said instructions stored on said at least one storage medium are further executable by the one or more processors to:
transmit the at least one updated radio model from at least one crowdsourcing server device to the second mobile device via at least one wireless transmission to enable the second mobile device to use the at least one updated radio model for positioning within the indoor environment.

41. The article of claim 38, wherein to transmit the at least one updated radio model said instructions stored on said at least one storage medium are further executable by the one or more processors to:
transmit the at least one updated radio model from at least one crowdsourcing server device to at least one map server device.

42. The article of claim 41, wherein to transmit the at least one updated radio model said instructions stored on said at least one storage medium are further executable by the one or more processors to:
transmit the at least one updated radio model from the at least one map server device to the second mobile device via at least one wireless transmission to enable the second mobile device to use the at least one updated radio model for positioning within the indoor environment.

43. The article of claim 38, wherein to update the at least one radio model said instructions stored on said at least one storage medium are further executable by the one or more processors to:
update the at least one radio model to produce the at least one updated radio model based, at least in part, on a reliability of the first mobile device.

44. The article of claim 38, wherein to update the at least one radio model said instructions stored on said at least one storage medium are further executable by the one or more processors to:
update the at least one radio model to produce the at least one updated radio model conditioned, at least in part, on one or more situational characteristics.

45. The article of claim 38, wherein:
to receive the at least one measurement said instructions stored on said at least one storage medium are further executable by the one or more processors to receive multiple measurements that correspond to multiple mobile devices; and
wherein to update the at least one radio model said instructions stored on said at least one storage medium are further executable by the one or more processors to:
filter the multiple measurements to produce at least one filtered measurement; and
update the at least one radio model to produce the at least one updated radio model based, at least in part, on the at least one filtered measurement.

46. The article of claim 38, wherein to update the at least one radio model said instructions stored on said at least one storage medium are further executable by the one or more processors to:
update one or more values, which are indicative of one or more received signal strength indications, that are included in the at least one updated radio model based, at least in part, on the at least one measurement that corresponds to the position of the first mobile device within the indoor environment, wherein the one or more received signal strength indications represent signals emanating from one or more wireless transmitter devices of the indoor environment.

47. The article of claim 38, wherein to update the at least one radio model said instructions stored on said at least one storage medium are further executable by the one or more processors to:
update one or more values, which are indicative of one or more round trip times, that are included in the at least one updated radio model based, at least in part, on the at least one measurement that corresponds to the position of the first mobile device within the indoor environment, wherein the one or more round trip times are associated with one or more communication exchanges between one or more mobile devices and one or more wireless transmitter devices of the indoor environment.

48. The article of claim 38, wherein said instructions stored on said at least one storage medium are further executable by the one or more processors to:
update at least one probability map by updating likely positions of mobile devices within the indoor environment based, at least in part, on the position of the first mobile device within the indoor environment to produce at least one updated probability map; and
transmit the at least one updated probability map to enable the second mobile device to use the at least one updated probability map for positioning within the indoor environment.

49. The article of claim 38, wherein said instructions stored on said at least one storage medium are further executable by the one or more processors to:
update at least one connectivity or routing graph based, at least in part, on the position of the first mobile device within the indoor environment to produce at least one updated connectivity or routing graph; and
transmit the at least one updated connectivity or routing graph to enable the second mobile device to use the at least one updated connectivity or routing graph for positioning within the indoor environment.

50. The method of claim 1, wherein updating the at least one radio model further comprises:
normalizing the at least one measurement that corresponds to a position of the first mobile device within the indoor environment based at least in part on a device type associated with the first mobile device.

* * * * *